(12) United States Patent
Van Kann et al.

(10) Patent No.: US 8,074,515 B2
(45) Date of Patent: Dec. 13, 2011

(54) GRAVITY GRADIOMETER

(75) Inventors: Frank Joachim Van Kann, Nedlands (AU); John Winterflood, Nedlands (AU)

(73) Assignee: Technological Resources Pty. Ltd., Melbourne, Victoria (AU)

( * ) Notice: Subject to any disclaimer, the term of this patent is extended or adjusted under 35 U.S.C. 154(b) by 0 days.

(21) Appl. No.: 12/714,634

(22) Filed: Mar. 1, 2010

(65) Prior Publication Data

US 2010/0154537 A1   Jun. 24, 2010

Related U.S. Application Data

(63) Continuation of application No. 11/722,076, filed on Sep. 19, 2007, now abandoned.

(30) Foreign Application Priority Data

| Oct. 6, 2005 | (AU) | ................................ | 2005905524 |
| Nov. 29, 2005 | (AU) | ................................ | 2005906669 |
| Jan. 13, 2006 | (AU) | ................................ | 2006900193 |
| Aug. 31, 2006 | (WO) | ................ | PCT/AU2006/001274 |

(51) Int. Cl.
*G01V 7/00* (2006.01)

(52) U.S. Cl. ................................... 73/382 G; 73/382 R

(58) Field of Classification Search ................ 73/382 G, 73/382 R; 33/366.25, 366.11, 366.13, 366.26
See application file for complete search history.

(56) References Cited

U.S. PATENT DOCUMENTS

| 2,743,415 A | * | 4/1956 | Williams et al. | ............... | 324/254 |
| 2,809,524 A | * | 10/1957 | Masterson | .................. | 73/382 R |
| 3,273,397 A | * | 9/1966 | Forward | ...................... | 73/382 R |
| 3,564,921 A | * | 2/1971 | Morrill | ........................ | 73/382 R |
| 3,758,854 A | * | 9/1973 | Zimmerman | .................. | 324/248 |
| 3,805,398 A | * | 4/1974 | Russell et al. | .................. | 33/312 |

(Continued)

FOREIGN PATENT DOCUMENTS

CN   1278067 A   12/2000

(Continued)

OTHER PUBLICATIONS

International Search Report for PCT/AU2006/001274, Oct. 23, 2006; 2 pages.

(Continued)

*Primary Examiner* — Hezron E Williams
*Assistant Examiner* — Samir M Shah
(74) *Attorney, Agent, or Firm* — Fish & Richardson P.C.

(57) ABSTRACT

A gravity gradiometer is disclosed which has a sensor in the form of bars (41 and 42) which are supported on a mounting (5) which has a first mount section (10) and a second mount section (20). A first flexure web (33) pivotally couples the first and second mount sections about a first axis. The second mount has a first part (25), a second part (26) and a third part (27). The parts (25 and 26) are connected by a second flexure web (37) and the parts (26 and 27) are connected by a third flexure web (35). The bars (41 and 42) are located in housings (45 and 47) and form a monolithic structure with the housings (45 and 47) respectively. The housings (45 and 47) are connected to opposite sides of the second mount section 20. The bars (41 and 42) are connected to their respective housings by flexure webs (59). Transducers (71) are located in proximity to the bars for detecting movement of the bars to in turn enable the gravitational gradient tensor to be measured.

6 Claims, 22 Drawing Sheets

U.S. PATENT DOCUMENTS

| | | | |
|---|---|---|---|
| 3,926,054 A * | 12/1975 | Buck | 73/382 R |
| 3,956,690 A * | 5/1976 | Rorden | 323/360 |
| 4,024,468 A * | 5/1977 | Hirschi | 324/329 |
| 4,398,167 A * | 8/1983 | Dickie et al. | 335/272 |
| 4,399,694 A * | 8/1983 | Mayer | 73/178 R |
| 4,713,890 A * | 12/1987 | Wells et al. | 33/366.25 |
| 4,809,545 A * | 3/1989 | Lyle | 73/152.16 |
| 4,828,376 A * | 5/1989 | Padera | 359/555 |
| 4,841,772 A * | 6/1989 | Paik | 73/382 G |
| 5,130,654 A * | 7/1992 | Mermelstein | 324/244 |
| 5,224,380 A * | 7/1993 | Paik | 73/510 |
| 5,293,119 A * | 3/1994 | Podney | 324/242 |
| 5,326,986 A * | 7/1994 | Miller et al. | 505/162 |
| 5,339,684 A * | 8/1994 | Jircitano et al. | 73/178 R |
| 5,357,802 A * | 10/1994 | Hofmeyer et al. | 73/382 G |
| 5,488,295 A * | 1/1996 | Seppa | 324/248 |
| 5,505,555 A * | 4/1996 | Van Kann et al. | 403/291 |
| 5,587,526 A * | 12/1996 | Lumley et al. | 73/382 G |
| 5,589,772 A * | 12/1996 | Kugai | 324/240 |
| 5,668,315 A * | 9/1997 | Van Kann et al. | 73/382 G |
| 5,728,935 A * | 3/1998 | Czompo | 73/382 G |
| 5,804,722 A * | 9/1998 | Van Kann et al. | 73/382 G |
| 5,817,939 A * | 10/1998 | Lumley et al. | 73/382 R |
| 5,922,951 A * | 7/1999 | O'Keefe et al. | 73/382 G |
| 5,962,781 A * | 10/1999 | Veryaskin | 73/382 G |
| 6,082,194 A * | 7/2000 | Gladwin | 73/382 G |
| 6,450,028 B1 * | 9/2002 | Vail, III | 73/382 G |
| 6,494,091 B2 * | 12/2002 | Couture | 73/382 R |
| 6,526,825 B2 * | 3/2003 | Manson | 73/382 R |
| 6,612,171 B1 * | 9/2003 | Stephenson et al. | 73/382 R |
| 6,658,935 B1 * | 12/2003 | Feinberg | 73/382 G |
| 6,668,646 B1 * | 12/2003 | Davies et al. | 73/382 R |
| 6,724,188 B2 * | 4/2004 | Butters et al. | 324/248 |
| 6,799,459 B2 * | 10/2004 | Dosch et al. | 73/382 G |
| 6,837,106 B2 * | 1/2005 | Etkin et al. | 73/382 G |
| 6,882,937 B2 * | 4/2005 | McElhinney | 702/9 |
| 6,885,192 B2 * | 4/2005 | Clarke et al. | 324/300 |
| 6,954,698 B2 * | 10/2005 | Tryggvason | 702/5 |
| 7,053,610 B2 * | 5/2006 | Clarke et al. | 324/300 |
| 7,081,747 B2 * | 7/2006 | Butters et al. | 324/248 |
| 7,305,879 B2 * | 12/2007 | Moody et al. | 73/382 R |
| 7,360,419 B2 * | 4/2008 | French et al. | 73/382 G |
| 7,584,544 B2 * | 9/2009 | Van Kann et al. | 33/366.25 |
| 2002/0092350 A1 * | 7/2002 | Etkin et al. | 73/382 G |
| 2003/0033086 A1 * | 2/2003 | Lee et al. | 702/5 |
| 2003/0209070 A1 * | 11/2003 | Dosch et al. | 73/382 G |
| 2004/0211255 A1 * | 10/2004 | Leeuwen et al. | 73/382 G |
| 2005/0116717 A1 * | 6/2005 | Dransfield et al. | 324/331 |
| 2005/0160815 A1 * | 7/2005 | Lee | 73/514.15 |
| 2005/0236909 A1 * | 10/2005 | Baker, Jr. | 310/10 |
| 2006/0117848 A1 * | 6/2006 | Raffalt | 73/313 |
| 2006/0156810 A1 * | 7/2006 | Brett et al. | 73/382 G |
| 2006/0207326 A1 * | 9/2006 | Moody et al. | 73/382 R |
| 2006/0277993 A1 * | 12/2006 | Wang et al. | 73/383 |
| 2007/0241747 A1 * | 10/2007 | Morley et al. | 324/248 |
| 2008/0074113 A1 * | 3/2008 | Clarke et al. | 324/309 |
| 2008/0115374 A1 | 5/2008 | Van et al. | |
| 2008/0115375 A1 * | 5/2008 | Van Kann | 33/366.25 |
| 2008/0115376 A1 * | 5/2008 | Van Kann | 33/366.25 |
| 2008/0115377 A1 * | 5/2008 | Van Kann | 33/366.25 |
| 2008/0115578 A1 * | 5/2008 | Van Kann et al. | 73/382 G |
| 2008/0116905 A1 * | 5/2008 | Van Kann | 324/686 |
| 2008/0120858 A1 * | 5/2008 | Van Kann et al. | 33/366.25 |
| 2008/0121035 A1 * | 5/2008 | Van Kann et al. | 73/382 G |
| 2008/0121036 A1 * | 5/2008 | Van Kann et al. | 73/382 G |
| 2008/0122435 A1 * | 5/2008 | Van Kann et al. | 324/207.15 |
| 2008/0163682 A1 * | 7/2008 | Van Kann et al. | 73/382 G |
| 2008/0173090 A1 * | 7/2008 | Van Kann et al. | 73/383 |
| 2008/0236277 A1 | 10/2008 | Van et al. | |
| 2008/0257038 A1 * | 10/2008 | Van Kann et al. | 73/382 G |
| 2008/0282796 A1 * | 11/2008 | Van Kann et al. | 73/382 G |
| 2008/0302179 A1 * | 12/2008 | Van Kann et al. | 73/382 G |
| 2008/0302180 A1 * | 12/2008 | Van Kann et al. | 73/382 G |
| 2008/0307883 A1 * | 12/2008 | Van Kann et al. | 73/382 G |

FOREIGN PATENT DOCUMENTS

| | | |
|---|---|---|
| DE | 19751724 A1 | 7/1999 |
| JP | 2002040153 A | 2/2002 |
| RU | 2046380 C1 | 10/1995 |
| RU | 2056642 C1 | 3/1996 |
| RU | 2127439 C1 | 3/1999 |
| RU | 2156481 C1 | 9/2000 |
| RU | 2167437 C1 | 5/2001 |
| RU | 2171481 C1 | 7/2001 |
| RU | 2171482 C1 | 7/2001 |
| RU | 2171483 C1 | 7/2001 |
| RU | 2172967 C1 | 8/2001 |
| RU | 2175773 C1 | 11/2001 |
| RU | 2221263 C1 | 1/2004 |
| RU | 2242032 C1 | 12/2004 |
| RU | 2253138 C1 | 5/2005 |
| RU | 2253882 C1 | 6/2005 |
| RU | 2290674 C2 | 12/2006 |
| WO | WO9007131 A1 | 6/1990 |
| WO | WO9741459 A1 | 11/1997 |
| WO | WO0031550 A1 | 6/2000 |
| WO | WO02044757 A3 | 9/2002 |
| WO | WO2007038819 A1 | 4/2007 |
| WO | WO2008061282 A1 | 5/2008 |

OTHER PUBLICATIONS

Soundararajan et al., "Nonideal Negative Resistors and Capacitors Using an Operational Amplifier", IEEE Transactions on Circuits and Systems, vol. 22, No. 9, 1975; pp. 760-763.

Paik, H., Superconducting tunable-diaphragm transducer for sensitive acceleration measurements, Journal of Applied Physics, vol. 47, No. 3, Mar. 1976, pp. 1168-1178.

Forward, R., "Electronic cooling of resonant gravity gradiometers", Journal of Applied Physics, vol. 50, No. 1, Jan. 1979, pp. 1-6.

Paik, H., J., "Superconducting tensor gravity gradiometer", Second International Symposium on Inertial Technology of Surveying and Geodesy, Banff, Canada, Jun. 1981.

Moody, M., et al., Superconducting gravity gradiometer for space and terrestrial applications:, Journal of Applied Physics, vol. 60, No. 12, Dec. 15, 1986, pp. 4308-4315.

Chan, H., et al, "Superconducting gravity gradiometer for sensitive gravity measurements", Physical Reviewa, vol. 35, No. 12, Jun. 15, 1987, pp. 3551-3571.

Moody, M., et al., "Gauss's Law Test of Gravity at Short Range", Physical Review Letters, vol. 70, No. 9, Mar. 1, 1993, pp. 1195-1198.

Paik, H., et al, 6 page reprint of "Airborne/shipborne SGG Survey System", Proceedings of the International Symposium on Kinematic Systems in Geodesy, Geomatics and Navigation, Banff, Canada, Jun. 1997, pp. 565-570.

Moody, M., et al., "Three-axis superconducting gravity gradiometer for sensitive gravity measurements", Review of Scientific Instruments, vol. 73, No. 11, Nov. 2002, pp. 3957-3974.

Moody, M., et al,., "Principle and performance of a superconducting angular accelerometer", Review of Scientific Instruments, vol. 74, No. 3, Mar. 2003, pp. 1310-1318.

Nadal-Guardia et al., "Constant Charge Operation of Capacitor Sensors Based on Switched Current Circuits", IEEE Sensors Journal, vol. 3, No. 6, Dec. 6, 2003, pp. 835-842.

Moody et al., "A Superconducting Gravity Gradiometer for Inertial Navigation", Position Location and Navigation Symposium, 2004, PLANS 2004, Apr. 26-29, 2004, pp. 775-781.

International Preliminary Report on Patentability issued in connection with PCT/AU2006/001274 dated Nov. 9, 2007.

Robert Matthews, "The University of Western Australia Gravity Gradiometer Group, Mobile Gravity Gradiometry," Department of Physics-University of Western Australia, 2002, 454 pages.

Mark Helm Dransfield, "Airborne Gravity Gradiometry," The University of Western Australia Department of Physics, 1994, 254 pages.

Robert David Penny, Development of Two Prototype Cryogenic Gravity Gradiometers for Geophysical Exploration, Department of Physics-University of Western Australia, 1992, 258 pages.

F. J. van Kann, End-of-Grant Report: Project No. 880, "An Airborne Cryogenic Gravity Gradiometer for Geophysical Exploration," The University of Western Australia Department of Physics, May 1992, 68 pages.

* cited by examiner

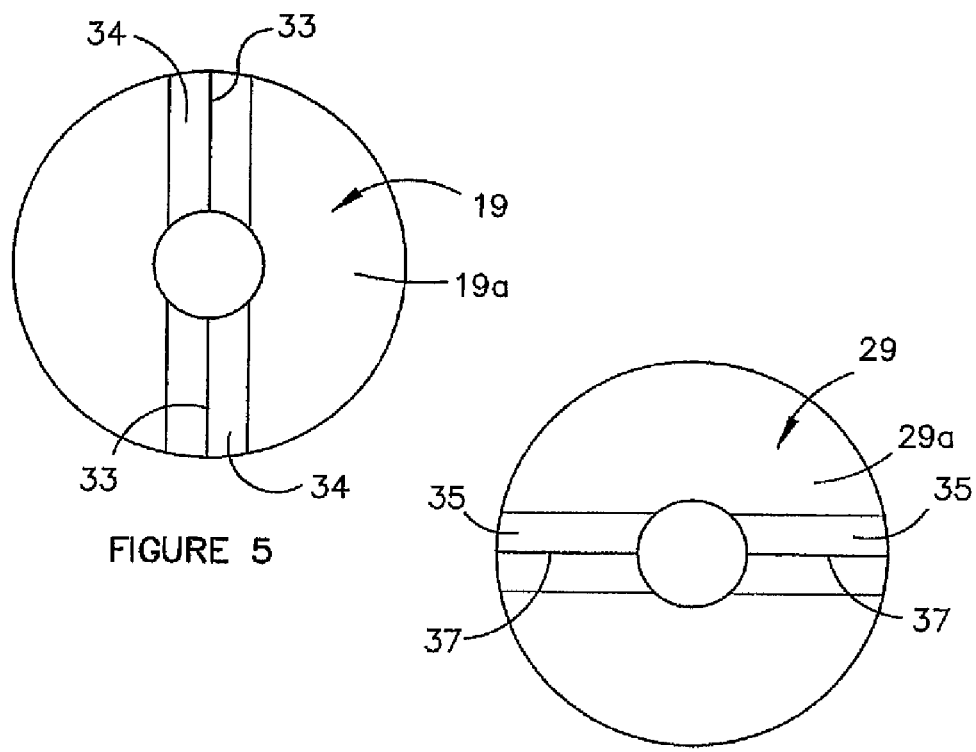
FIGURE 5
FIGURE 6
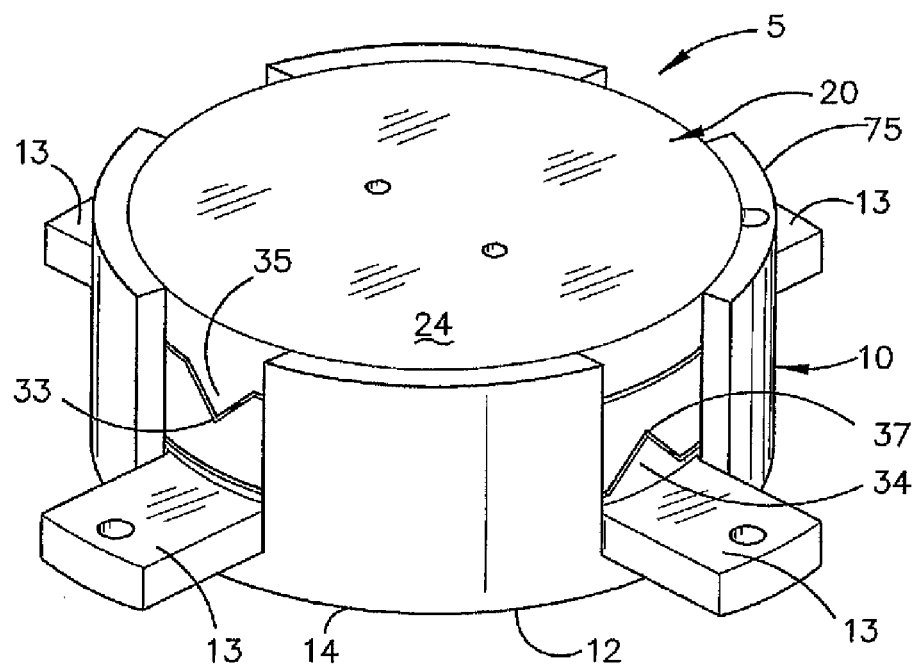
FIGURE 7

GRAVITY GRADIOMETER

CROSS REFERENCE TO RELATED APPLICATIONS

This application is a continuation of U.S. application Ser. No. 11/722,076, filed Sep. 19, 2007, and titled "Gravity Gradiometer," which claims the benefit of foreign priority applications filed in Australia as Serial No. 2005905524, filed Oct. 6, 2005; Serial No. 2005906669, filed Nov. 29, 2005; Serial No. 2006900193, filed Jan. 13, 2006; and PCT/AU2006/01274, filed Aug. 31, 2006 The disclosures of all of these prior applications are considered part of (and are incorporated by reference in) the disclosure of this application.

FIELD OF THE INVENTION

This invention relates to a gravity gradiometer, and in particular, but not exclusively, to a gravity gradiometer for airborne use. The invention has particular application for measuring diagonal and off-diagonal components of the gravitational gradient tensor.

BACKGROUND OF THE INVENTION

Gravimeters are widely used in geological exploration to measure the first derivatives of the earth's gravitational field. Whilst some advances have been made in developing gravimeters which can measure the first derivatives of the earth's gravitational field because of the difficulty in distinguishing spatial variations of the field from temporal fluctuations of accelerations of a moving vehicle, these measurements can usually be made to sufficient precision for useful exploration only with land-based stationary instruments.

Gravity gradiometers (as distinct from gravimeters) are used to measure the second derivative of the gravitational field and use a sensor which is required to measure the differences between gravitational forces down to one part in $10^{12}$ of normal gravity.

Typically such devices have been used to attempt to locate deposits such as ore deposits including iron ore and geological structures bearing hydrocarbons.

International publication WO 90/07131 partly owned by the present applicants associated company discloses a gravity gradiometer. The gradiometer includes a gimbal bearing arrangement comprised of three concentric rings in which is mounted the sensing equipment. The sensing equipment generally comprises two spaced apart bars respectively located in shielded housings and each mounted on a web bearing. The instrument disclosed in that application is relatively complicated in that it includes a large number of parts and is relatively heavy which is a disadvantage particularly in airborne applications.

SUMMARY OF THE INVENTION

The invention provides a gravity gradiometer for measuring components of the gravity gradient tensor, comprising:
a sensor for measuring the components of the gravity gradient tensor;
a mounting for providing rotation about three substantially orthogonal axes, and for supporting the sensor;
a stabilising mechanism for stabilising the mounting by adjusting the mounting about at least one of the axes; and
an angular accelerometer for providing at least one of a plurality of signals for producing an indication of movement of the mounting so that the stabilising mechanism can produce a torque in response to the signal to the mounting to counteract movement of the mounting and stabilise the mounting and sensor; and
wherein the angular accelerometer comprises a mass having zero quadrupole moment.

Thus, the angular accelerometer is not sensitive to the gravity gradient. However, more importantly, the gradiometer is also insensitive to centrifugal force errors and therefore the accelerometer can provide a signal indicative of rotation of the sensor about a predetermined axis so that that rotation can be compensated for.

Preferably the mass is formed in a housing and coupled to the housing by a flexure web.

Preferably the mass is formed by a cut through the housing, except for where the mass connects to the housing by the flexure web.

Preferably the mass is of chevron shape.

BRIEF DESCRIPTION OF THE DRAWINGS

Preferred embodiments of the invention would be described, by way of example, with reference to the accompanying drawings, in which:
FIG. 5 is a cross-sectional view along the line IV-IV of FIG. 3;
FIG. 6 is a cross-sectional view along the line V-V of FIG. 3;
FIG. 7 is a view of the assembled structure.

DETAILED DESCRIPTION OF THE PREFERRED EMBODIMENTS

Figure 1:
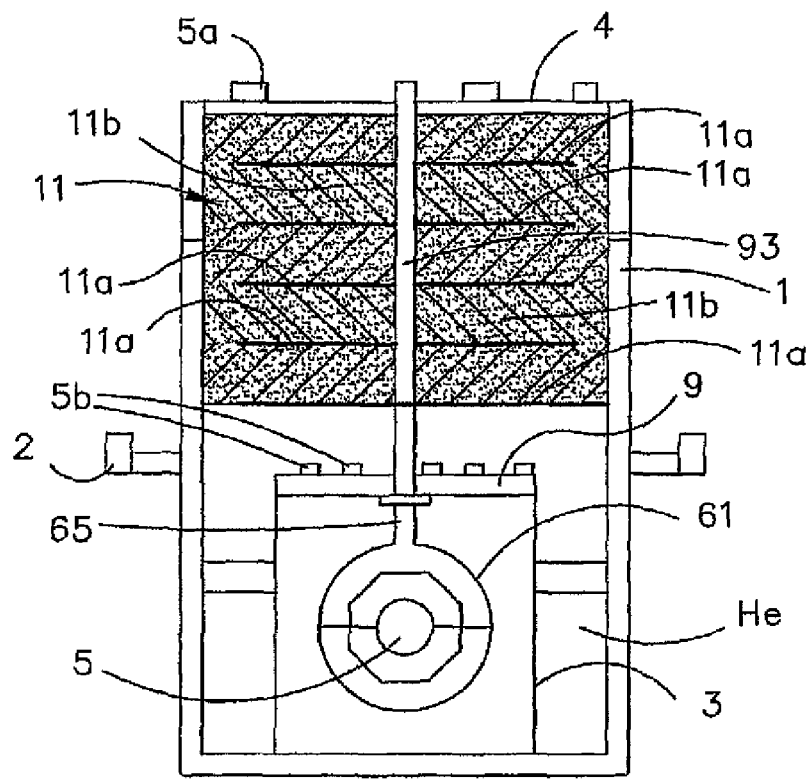
FIG. 1 is a schematic view of a gradiometer of one embodiment of the invention.

FIG. 1 is a schematic view of a gravity gradiometer according to the preferred embodiment of the invention.

The gradiometer shown in FIG. 1 comprises a double walled Dewar 1 which is supported in an external platform 2. The external platform 2 enables adjustment of the Dewar and therefore the contents of the Dewar about three orthogonal axes. The external platform 2 is generally known and its adjustment by suitable motors or the like is also known. Thus, a detailed description will not be provided.

A vacuum canister 3 is provided in the Dewar and the Dewar is supplied with liquid gas such as liquid helium He so that the gradiometer can operate at cryogenic temperature.

The Dewar 1 is closed by an end plate 4 which includes connectors 5a for connecting electrical leads (not shown) to external components (not shown).

The canister 3 is closed by an end plate 9 which includes connectors 5b for connecting electric leads (not shown) to the connectors 5a. The gradiometer has a main casing 61 formed from a twelve-sided ring 62 and hemispherical domes 63 (see FIG. 12). An internal mounting 5 is connected to the ring 62. The ring 62 carries a support 65 to which a feed through flange 9 is coupled. A neck plug 11 formed of baffles 11a which sandwich foam 11b is provided above the canister 3. The baffles 11a are supported on a hollow rod 93 which extends to the canister 3 and which is also used to evacuate the canister 3.

Figure 2:
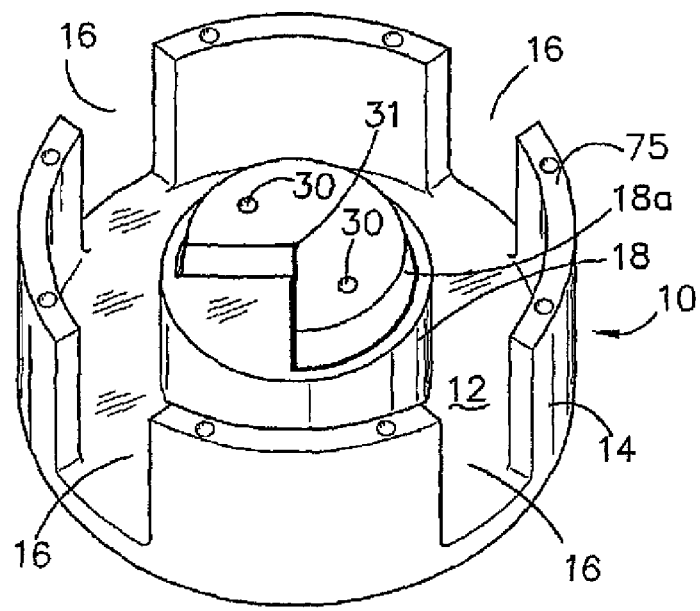
FIG. 2 is a perspective view of a first mount forming part of a mounting of the gradiometer of the preferred embodiment.

With reference to FIG. 2 a first mount 10 of a rotatable mounting 5 (FIG. 7) of the gradiometer is shown which comprises a base 12 and an upstanding peripheral wall 14. The peripheral wall 14 has a plurality of cut-outs 16. The base 12 supports a hub 18.

Figure 3:
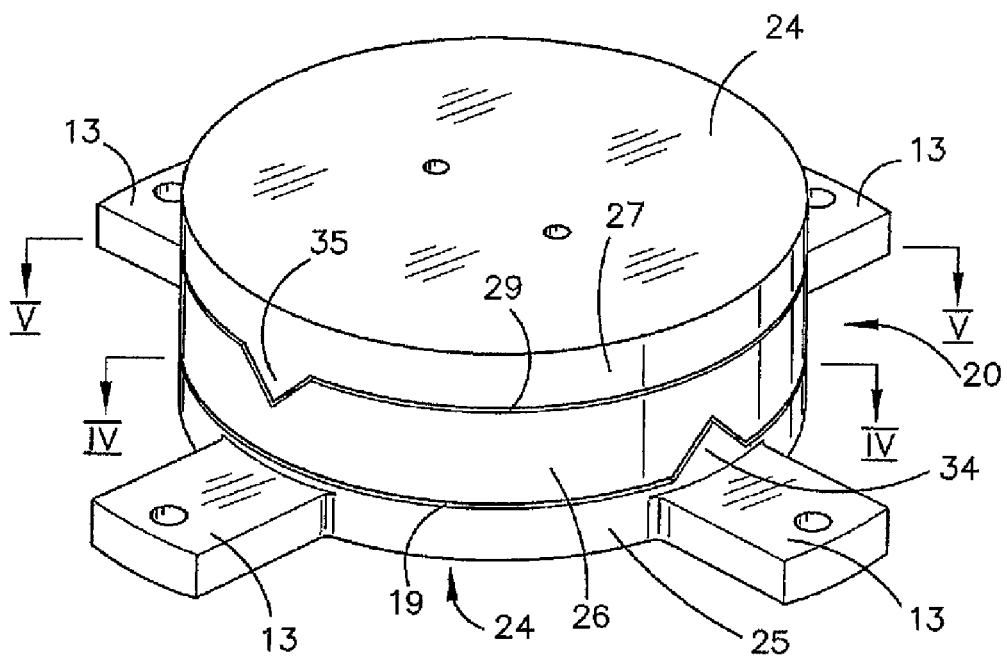
FIG. 3 is a view of a second mount of the mounting.
Figure 4:
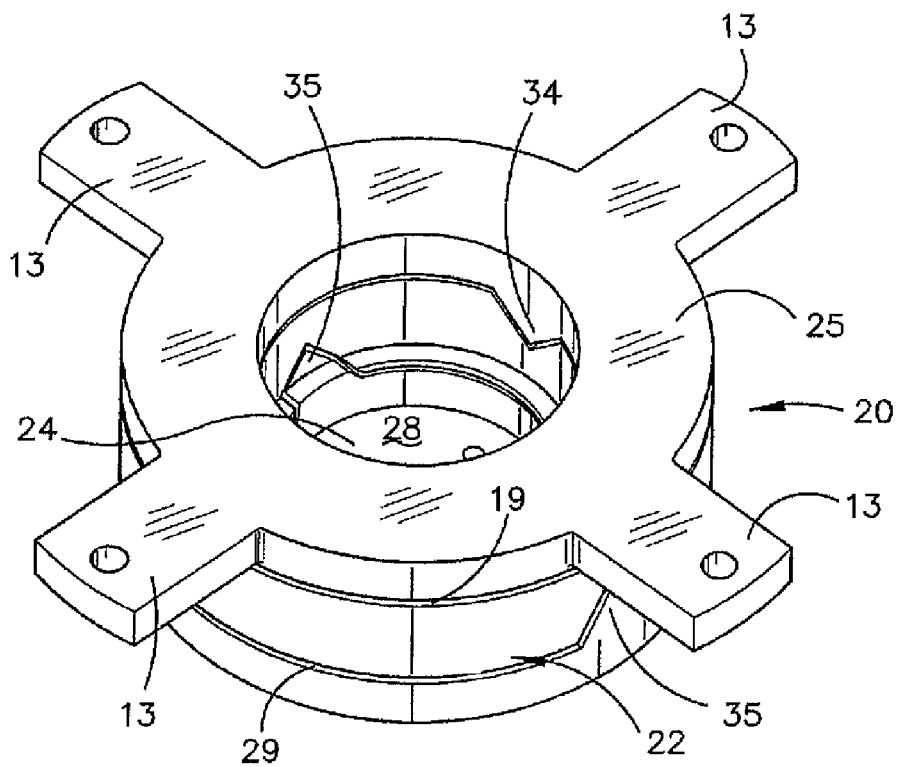
FIG. 4 is a view from underneath the mount of FIG. 3.

FIGS. 3 and 4 show a second mount 20 which comprises a peripheral wall 22 and a top wall 24. The peripheral wall 22 has four lugs 13 for connecting the mount to the casing 61. The top wall 24 and the peripheral wall 22 define an opening 28. The peripheral wall 22 has a first part 25, a second part 26 and a third part 27. The second mount 20 is a monolithic integral structure and the first part 25 is formed by making a circumferential cut 19 through the peripheral wall except for the formation of flexure webs as will be described hereinafter. The third part 27 is formed by making a second circumferential cut 29 through the peripheral wall 22 except for flexure webs which will also be described hereinafter. The second mount 20 is mounted on the first mount 10 by locating the hub 18 into the opening 28 and the lugs 13 through respective cut-outs 16 as is shown in FIG. 7.

The first mount 10 is joined to the second mount 20. The first flexure web 31 is formed in the first mount 10 so a primary mount portion of the mount 10 can pivot about a web 31 relative to a secondary mount portion of the mount 10. This will be described in more detail with reference to the second embodiment shown in FIGS. 13 to 21.

The lugs 13 connect the mounting 5 in the canister 3 which, in turn, locates in the Dewar 1 for cryogenic operation of the gradiometer.

The Dewar is in turn mounted in a first external platform for course rotational control of the gradiometer about three orthogonal x, y, x axes. The mounting 5 mounts the sensor 40 (which will be described in more detail hereinafter and which is preferably in the form of a mass quadrupole) for much finer rotational adjustment about the x, y and z axes for stabilising the gradiometer during the taking of measurements particularly when the gradiometer is airborne.

The first flexure web 31 allows the first mount 10 to move relative to the second mount 20 about a z axis shown in FIG. 7.

FIGS. 5 and 6 are views along the lines IV and V respectively which in turn are along the cuts 19 and 29 shown in FIG. 3. The peripheral wall 22 may be cut by any suitable cutting instrument such as a wire cutter or the like. FIG. 5 shows the bottom surface 19a formed by the cut 27. As is apparent from FIGS. 3 and 5 the cut 27 has two inverted v-shaped peaks 34. The apex of the peaks 34 is not cut and therefore form a second flexure web 33 which join the first part 25 to the second part 26. Thus, the second part 26 is able to pivotally rotate relative to the first part 25 about the x axis in FIG. 7. The second cut 29 is shown in FIG. 6 and again the bottom surface 29a formed by the cut 29 is visible. Again the second cut 29 forms two v-shaped peaks 35 and the apexes of the peaks 35 are not cut and therefore form a third flexure web 37 which connect the second part 26 to the third part 27. Thus, the third part 27 is able to pivotal rotate about the y axis shown in FIG. 7.

Figure 8:
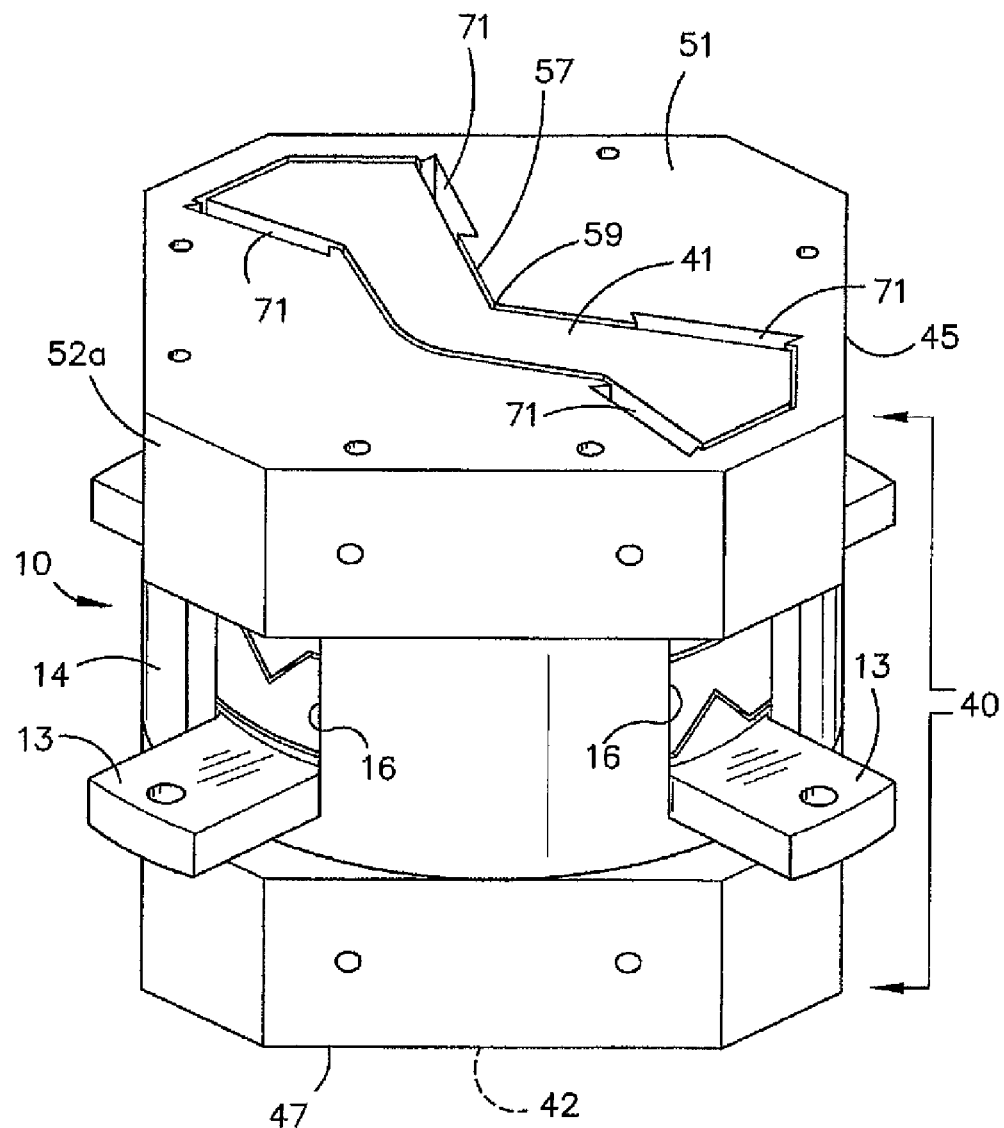
FIG. 8 is a view showing the sensor mounted on the gimbal structure.

FIG. 8 shows sensor 40 mounted on the mounting. The sensor 40 is an Orthogonal Quadrupole Responder—OQR sensor formed of a first mass and a second mass in the form of a first bar 41 and a second bar 42 (not shown in FIG. 8) orthogonal to the bar 41 and which is of the same shape as the bar 41.

The bar 41 is formed in a first housing 45 and the bar 42 is formed in a second housing 47. The bar 41 and housing 45 is the same as bar 42 and the housing 47 except that one is rotated 90° with respect to the other so that the bars are orthogonal. Hence only the housing 45 will be described.

Figure 9:
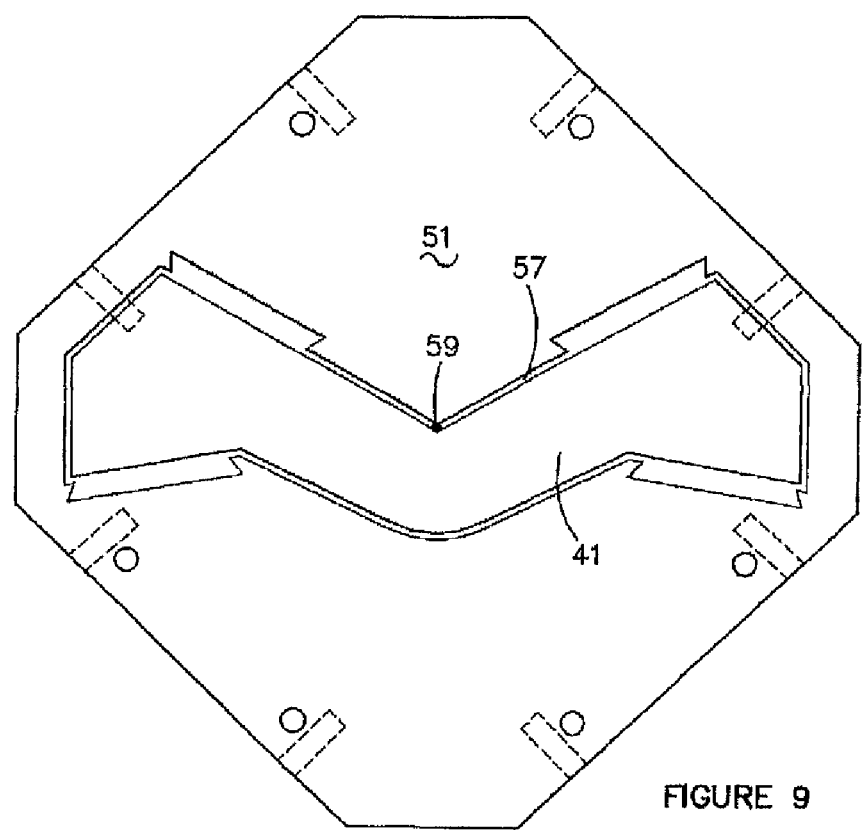
FIG. 9 is a plan view of a bar of the preferred embodiment.

The housing 45 has an end wall 51 and a peripheral side wall 52a. The end wall 51 is connected to rim 75 (FIGS. 2 and 7) of the wall 14 of the first mount 10 by screws or the like (not shown). The bar 41 is formed by a cut 57 in the wall 51 except for a fourth flexure web 59 which joins the bar 41 to the wall 51. The flexure web is shown enlarged in the top view of the bar 41 in FIG. 9. Thus, the bar 41 is able to pivot relative to the housing 45 in response to changes in the gravitational field. The bar 42 is mounted in the same way as mentioned above and also can pivot relative to its housing 47 in response to changes in the gravitational field about a fifth flexure web 59. The housing 47 is connected to base 12 (FIG. 2) of the first mount 10.

The bar 41 and the housing 45 together with the flexure web 59 are an integral monolithic structure.

Transducers 71 (not shown in FIGS. 2 to 6) are provided for measuring the movement of the bars and for producing output signals indicative of the amount of movement and therefore of the measurement of the differences in the gravitational field sensed by the bars.

Figure 10:
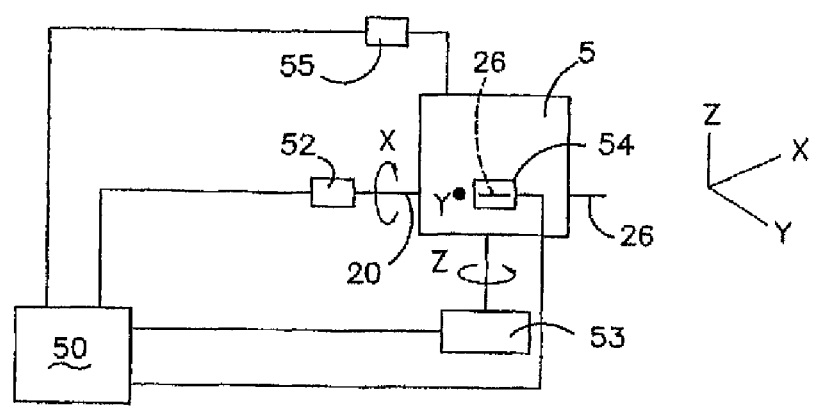
FIG. 10 is a diagram showing actuator control.

FIG. 10 is a schematic block diagram showing actuator control to stabilise the gradiometer by rotating the mounting 5 about three orthogonal axes (x, y, z). A controller 50 which may be a computer, microprocessor or the like outputs signals to actuators 52, 53, 54 and 55. The actuator 52 could rotate the mounting 5 about the x axis, the actuator 54 could rotate the mounting 5 about the y axis and the actuator 54 could rotate the mounting 5 about the z axis. However, in the preferred embodiment, two of the four actuators 52, 53, 54 and 55 are used to rotate the mounting about each axis so that rotation about each axis is caused by a combination of two linear movements provided from two actuators. The linear movement provided by each actuator will be described with reference to FIGS. 31 and 32. The position of the mounting 5 is monitored so that appropriate feedback can be provided to the controller 50 and the appropriate control signals provided to the actuators to rotate the support 10 as is required to stabilise the support during movement through the air either within or towed behind an aircraft.

The preferred embodiment also includes angular accelerometers which are similar in shape to the bars 41 and 42 but the shape is adjusted for zero quadrupole moment. The linear accelerometers are simple pendulous devices with a single micro pivot acting as the flexural hinge.

Figure 11:
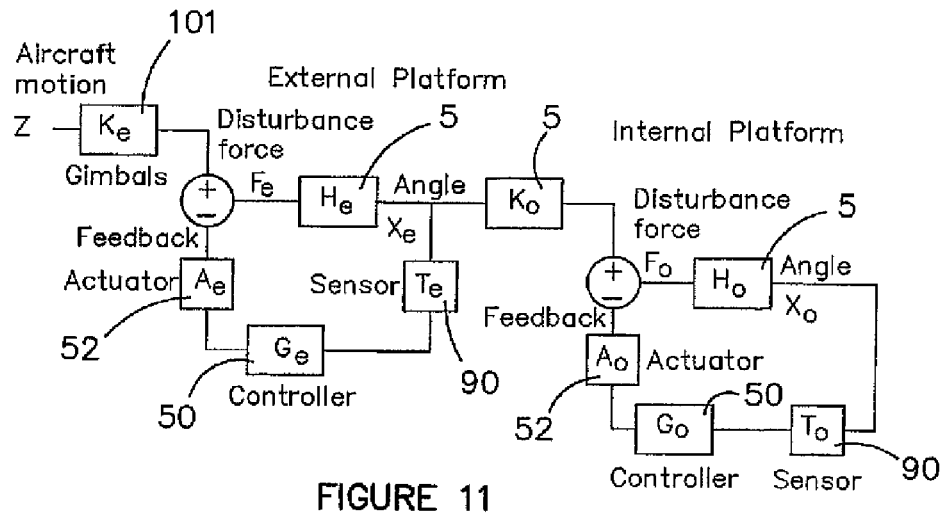
FIG. 11 is a block diagram showing operation of the rotatable support system.

FIG. 11 is a view of a feedback control used in the preferred embodiment.

Figure 12:
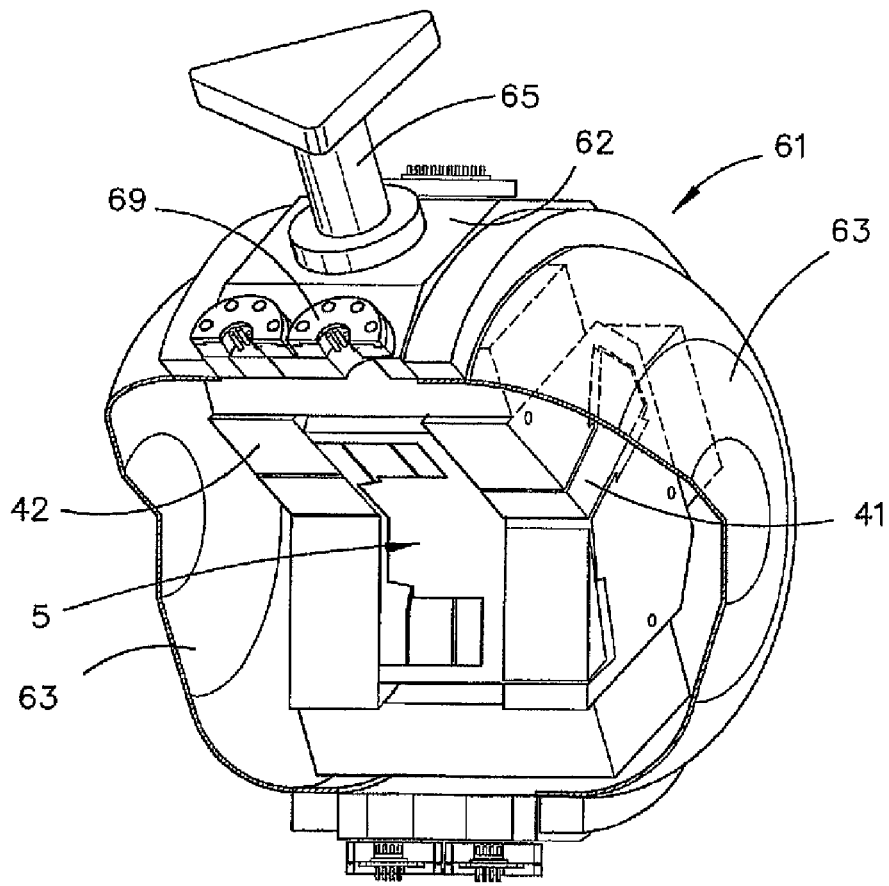
FIG. 12 is a view of a gradiometer of the preferred embodiment.

FIG. 12 is a cut away view of the gradiometer ready for mounting in the Dewar 1 for cryogenic operation which in turn is to be mounted in the external platform. Although FIGS. 2 to 8 show the gradiometer with the bars 41 and 42 top and bottom, the instrument is actually turned on its side (90°) so that the bars 41 and 42 are at the ends as is shown in FIG. 12.

FIG. 12 shows the mounting 5 arranged within the casing 61 and formed by the ring 62 and the transparent hemispherical ends 63. The ring 22 has connectors 69 for connecting the internal wiring from transducers 71 (see FIG. 8) and SQuID (Superconducting Quantum Interference Device) Electronics located in the casing 61 to the connectors 5b (FIG. 1).

The transducers 71 measure the angle of displacement of the bars 41 and 42 and the control circuitry (not shown) is configured to measure the difference between them.

Error correction can be performed numerically based on digitised signals from the accelerometers and a temperature sensor.

The transducers 71 are SQuID based transducers and the error correction is made possibly by the large dynamic range and linearity of the SQuID based transducers.

FIGS. 13 to 21 show a second embodiment in which like parts indicate like components to those previously described.

Figure 19:
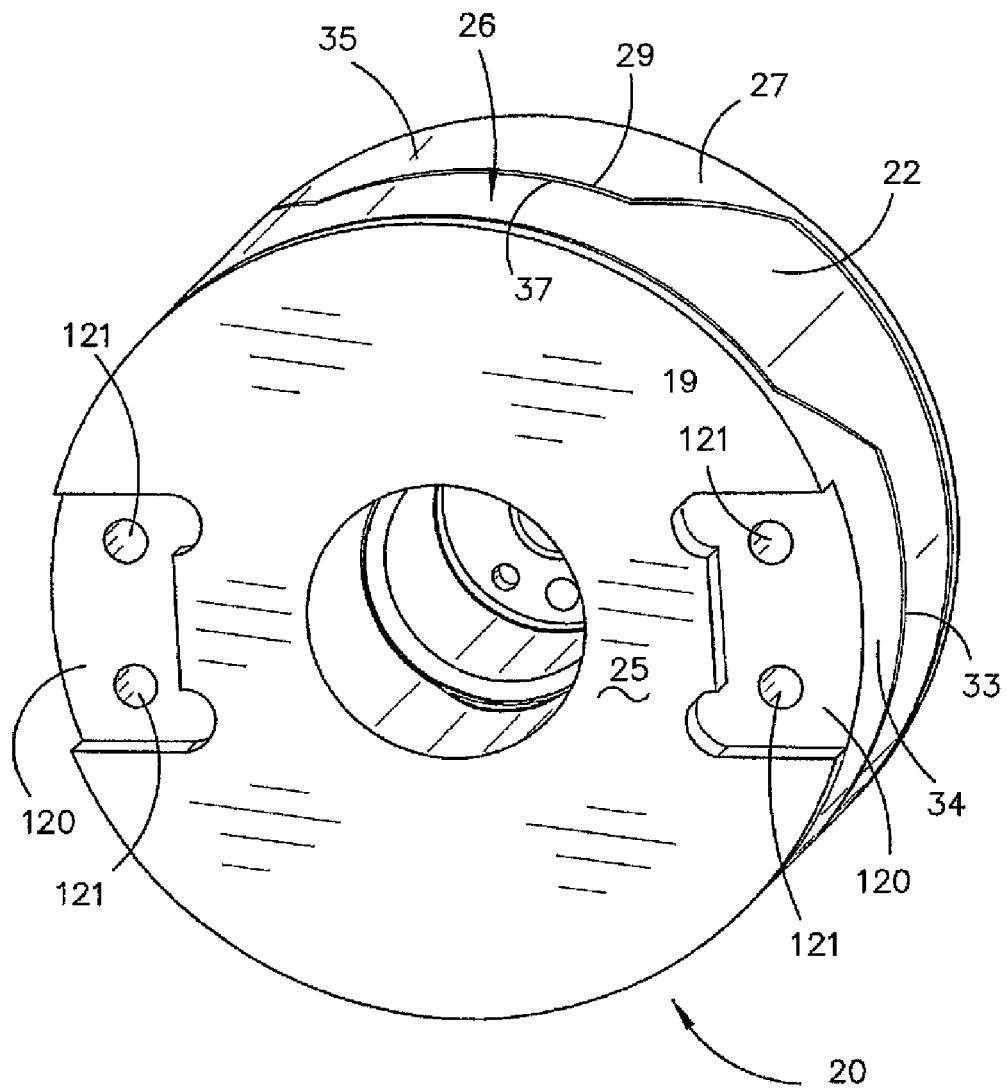
FIG. 19 is a view from beneath of the second mount of the second embodiment.
Figure 20:
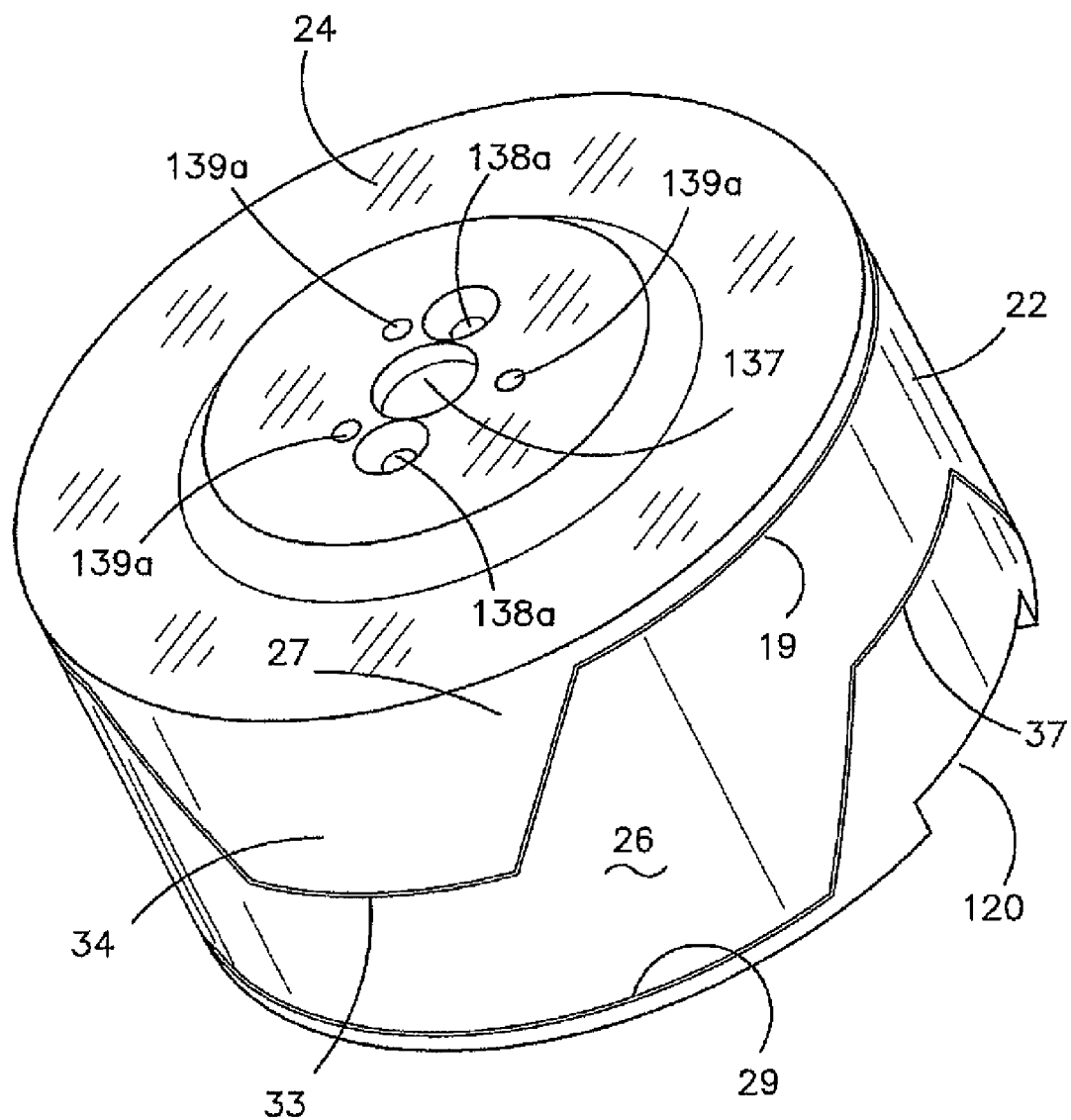
FIG. 20 is a view of the second mount of FIG. 19 from above.
Figure 21:
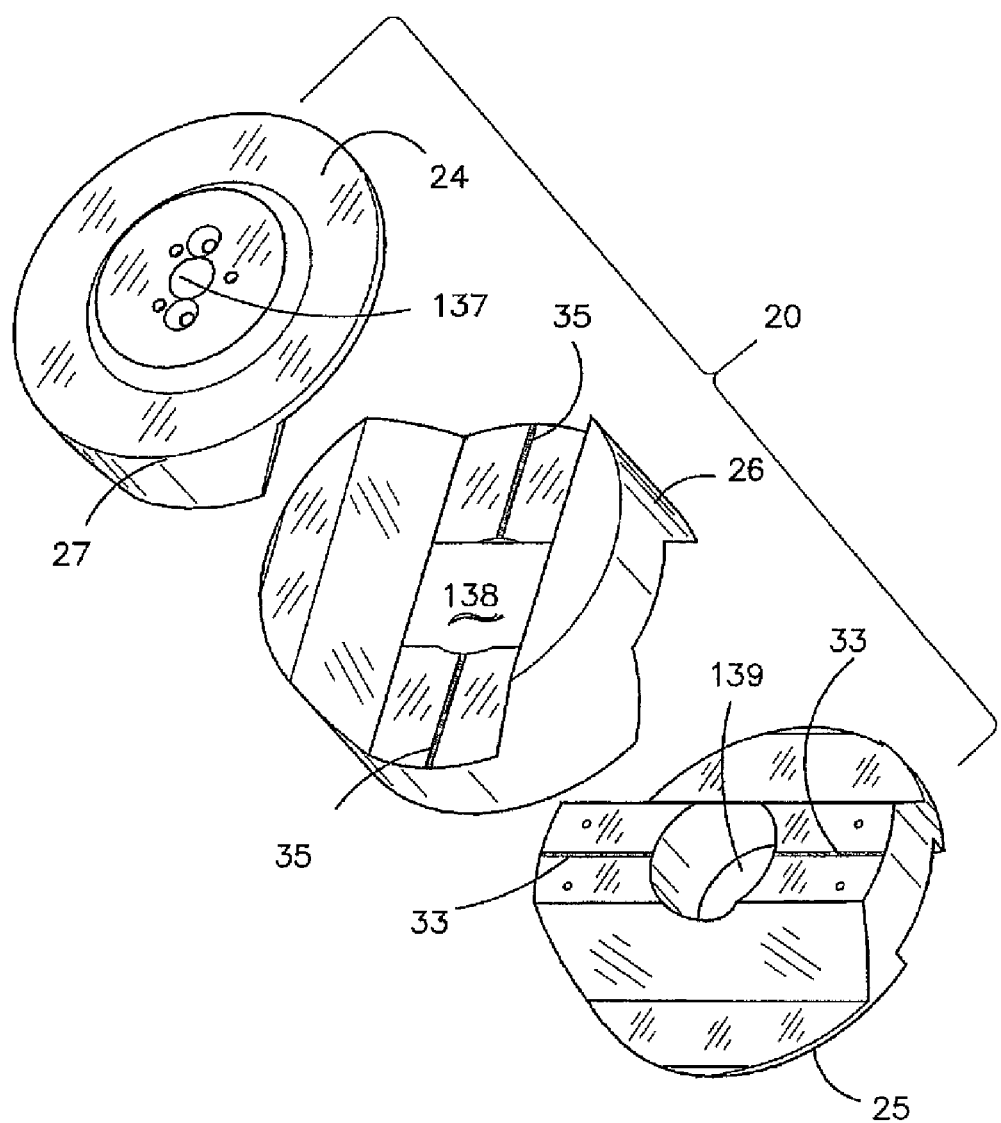
FIG. 21 is an exploded view of the second mount of the second embodiment.

In this embodiment the first mount 10 has cut-outs 80 which effectively form slots for receiving lugs (not shown) which are connected to the mount 10 in the cut-outs 80 and also to the second mount 20 shown in FIGS. 19 to 21. In this embodiment the lugs are separate components so that they can be made smaller, and more easily, made than being cut with the second mount section 20 which forms the second flexure web 33 and the third flexure web 37.

Figure 13:
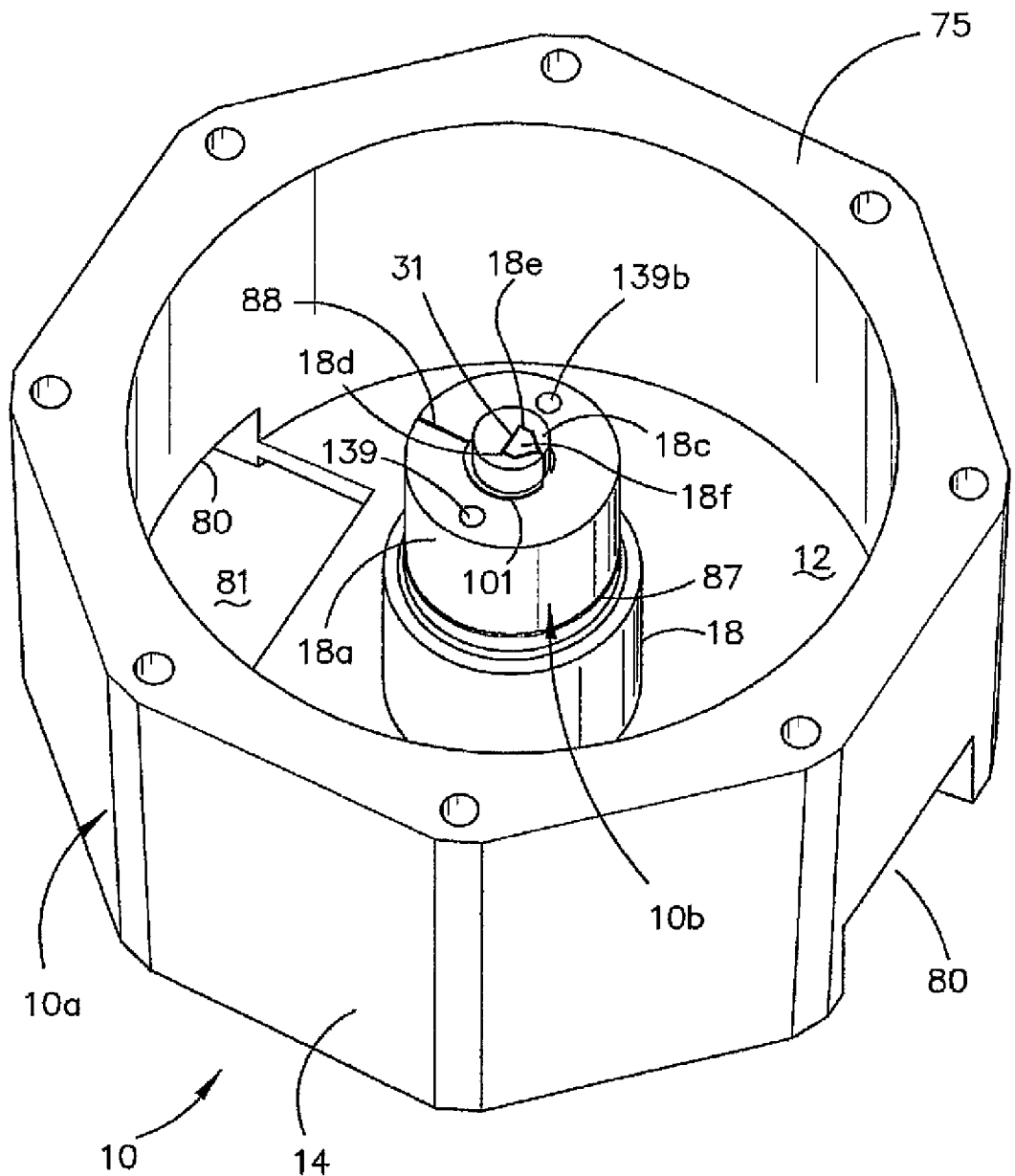
FIG. 13 is a view of a first mount of a second embodiment.

In FIG. 13 a cut 87 is made to define the part 18a of the hub 18. The cut 87 then extends radially inwardly at 88 and then around central section 18c as shown by cut 101. The cut 101 then enters into the central section 18c along cut lines 18d and 18e to define a core 18f. The core 18f is connected to the central section 18c by the flexural web 31 which is an uncut part between the cut lines 18e and 18d. The part 10a therefore forms a primary mount portion of the mount 10 which is separated from a secondary mount portion 10a of the mount 10 except for where the portion 18a joins the portion 10a by the flexural web 31. The part 18a effectively forms an axle to allow for rotation of the part 18a relative to the part 10a in the z direction about the flexure web 31.

Figure 14:
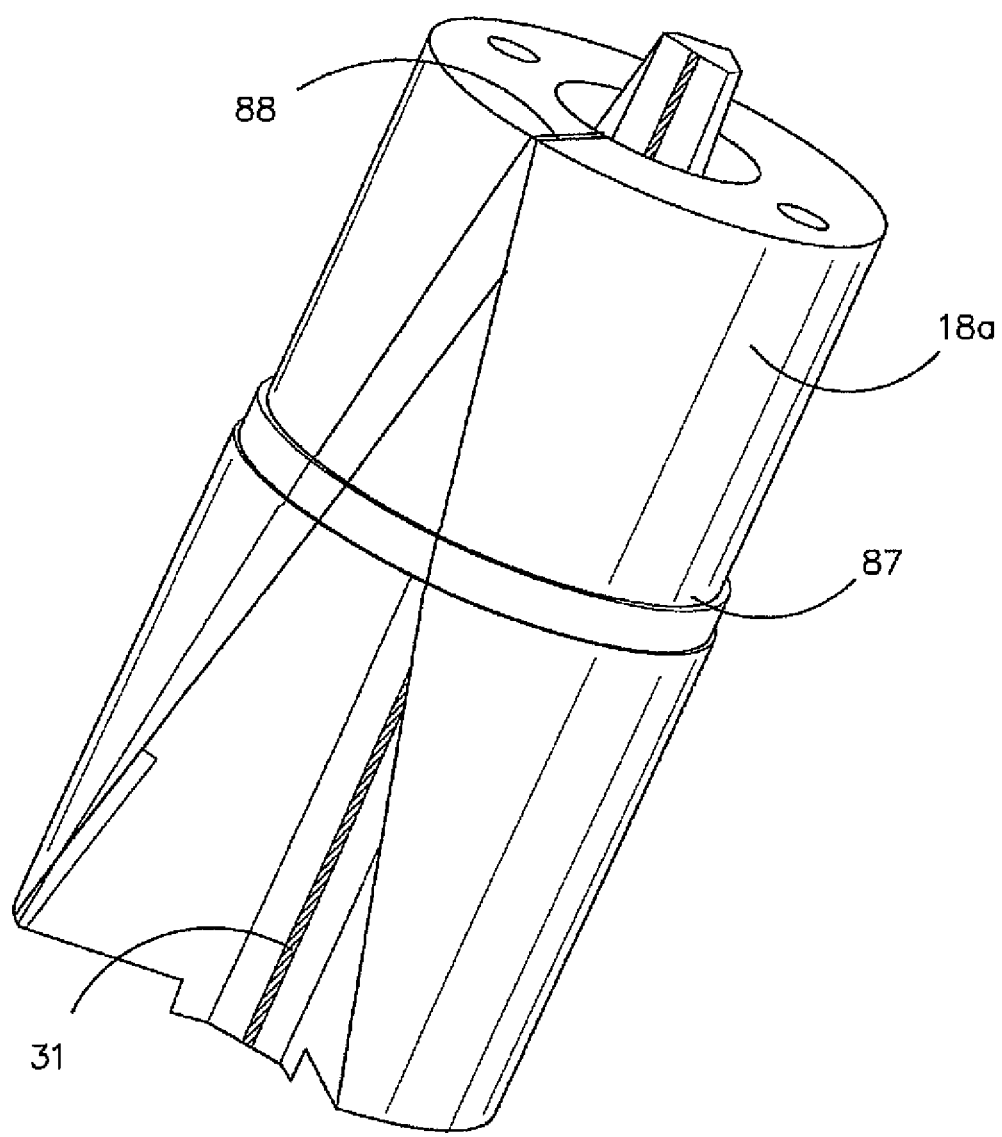
FIG. 14 is a view of part of the mounting of FIG. 13 to illustrate the location and extent of the flexural web of the first mount.
Figure 15:
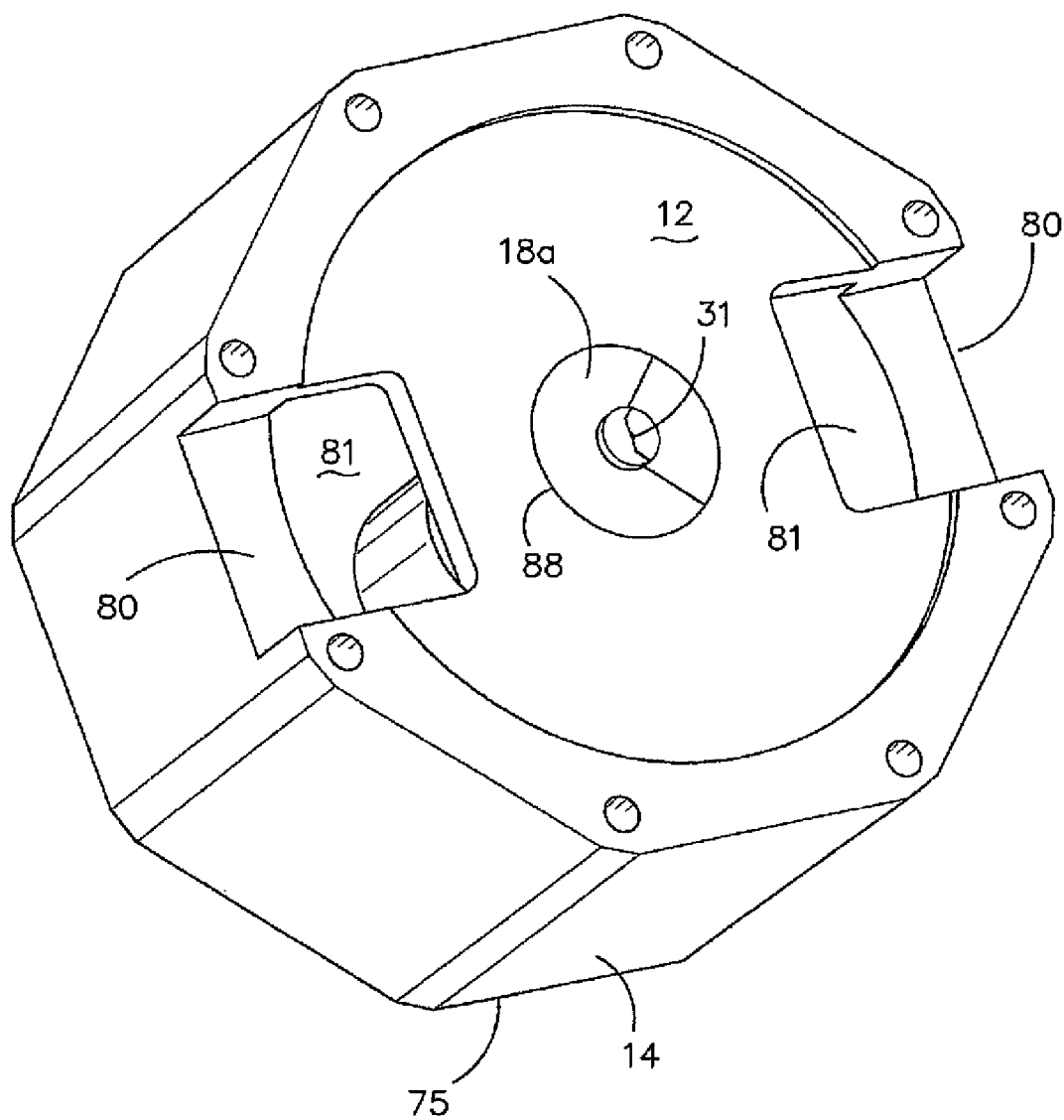
FIG. 15 is a view of the mounting of FIG. 13 from beneath.
Figure 17:
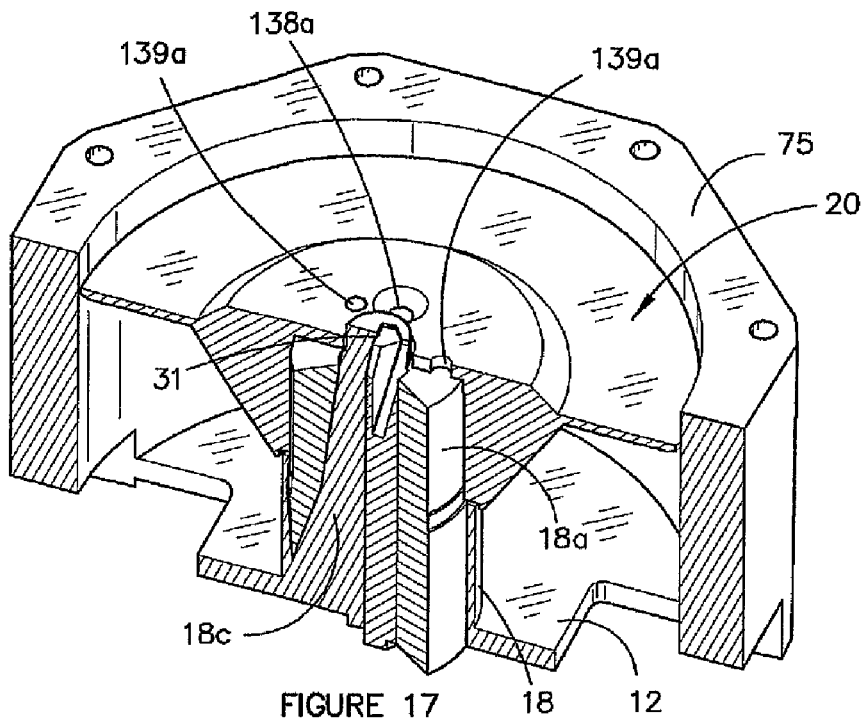
FIG. 17 is a cross-sectional view through the assembly shown in FIG. 16.
Figure 18:
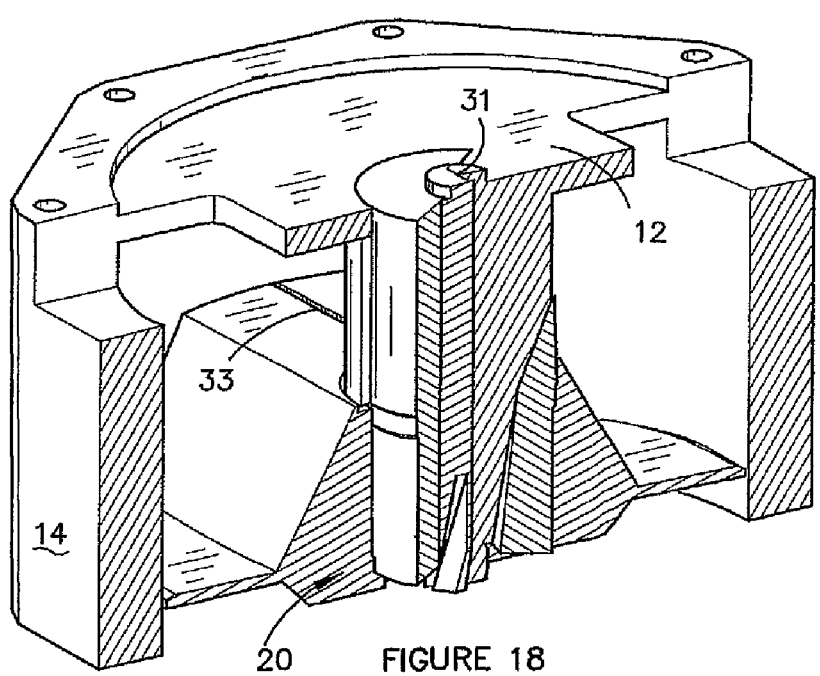
FIG. 18 is a view from beneath of the section shown in FIG. 17.

As is shown in FIG. 14, the cut line 88 tapers outwardly from the upper end shown in FIG. 14 to the lower end and the core 18c tapers outwardly in corresponding shape, as best shown in FIG. 17.

As is apparent from FIGS. 13 to 18, the first mount 10 is octagonal in shape rather than round, as in the previous embodiment.

Figure 16:
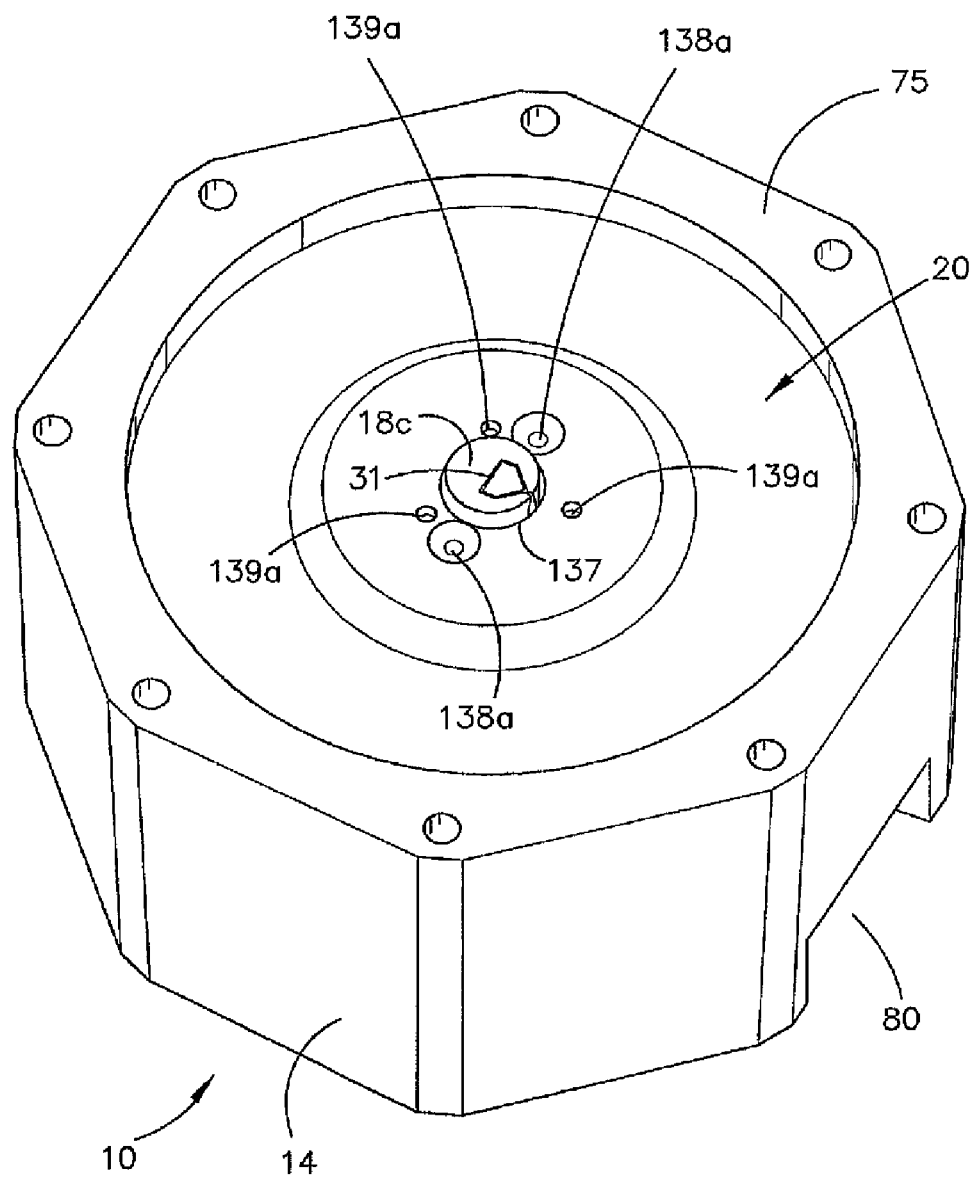
FIG. 16 is a view of the mounting of FIG. 13 including a second mount of the second embodiment.

FIGS. 19 to 21 show the second mount 20. FIG. 16 shows the second mount 20 mounted in the first mount 10. As is best shown in FIGS. 19 and 20, the second mount 20 has cut-outs 120 which register with the cut-outs 80 for receiving lugs (not shown). The lugs can bolt to the second mount 20 by bolts which pass through the lugs and into bolt holes 121. The lugs (not shown) are mounted to the mount 20 before the mount 20 is secured to the first mount 10.

In the embodiment of FIGS. 19 and 20, the peaks 34 and inverted peaks 35 are flattened rather than of V-shape as in the previous embodiment.

In this embodiment, top wall 24 is provided with a central hole 137 and two attachment holes 138a. Three smaller holes 139a are provided to facilitate pushing of the housing 45 off the part 18a if disassembly is required. When the second mount 20 is located within the first mount 10, the upper part of central section 18c projects through the hole 137, as best shown in FIG. 16. The mount 20 can then be connected to the mount 10 by fasteners which pass through the holes 138 and engage in holes 139b (see FIG. 13) in the part 18a.

Thus, when the first housing 45 and its associated bar 41 is connected to the rim 75 of the housing 10 and the second housing 47 is connected to the base 12, the housings 45 and 47 and their associated bars 41 and 42 are therefore able to move about three orthogonal axes defined by the flexure web 31, the flexure web 33 and the flexure web 37.

As is best seen in FIG. 21 which is an exploded view of the three parts 25, 26 and 27 which make up the second mount 20, an opening extends through the mount 20 which is formed by the hole 137, hole 138 and hole 139. It should be understood that the mount 20 shown in FIG. 21 is a monolithic structure and is merely shown in exploded view to clearly illustrate the location of the flexural webs 33 and 35. Obviously the flexural web 33 shown in FIG. 21 joins with the part 26 and the flexural web 35 shown in FIG. 21 joins with the part 27. The holes 137, 138 and 139 define a passage through which the axle or first portion 18a of the first mount 10 can extend when the second mount 20 is located in the first mount 10.

Thus, when the second mount 20 is fixed to the part 18a, the second mount 20 can pivot with the first portion 10a of the first mount 10 about a z axis defined by the flexure web 31 whilst the second portion formed by the part 18a remains stationary. Movement about the x and y axes is achieved by pivotal movement of the second mount 20 about the flexure webs 33 and 35 as previously described.

Figure 22:
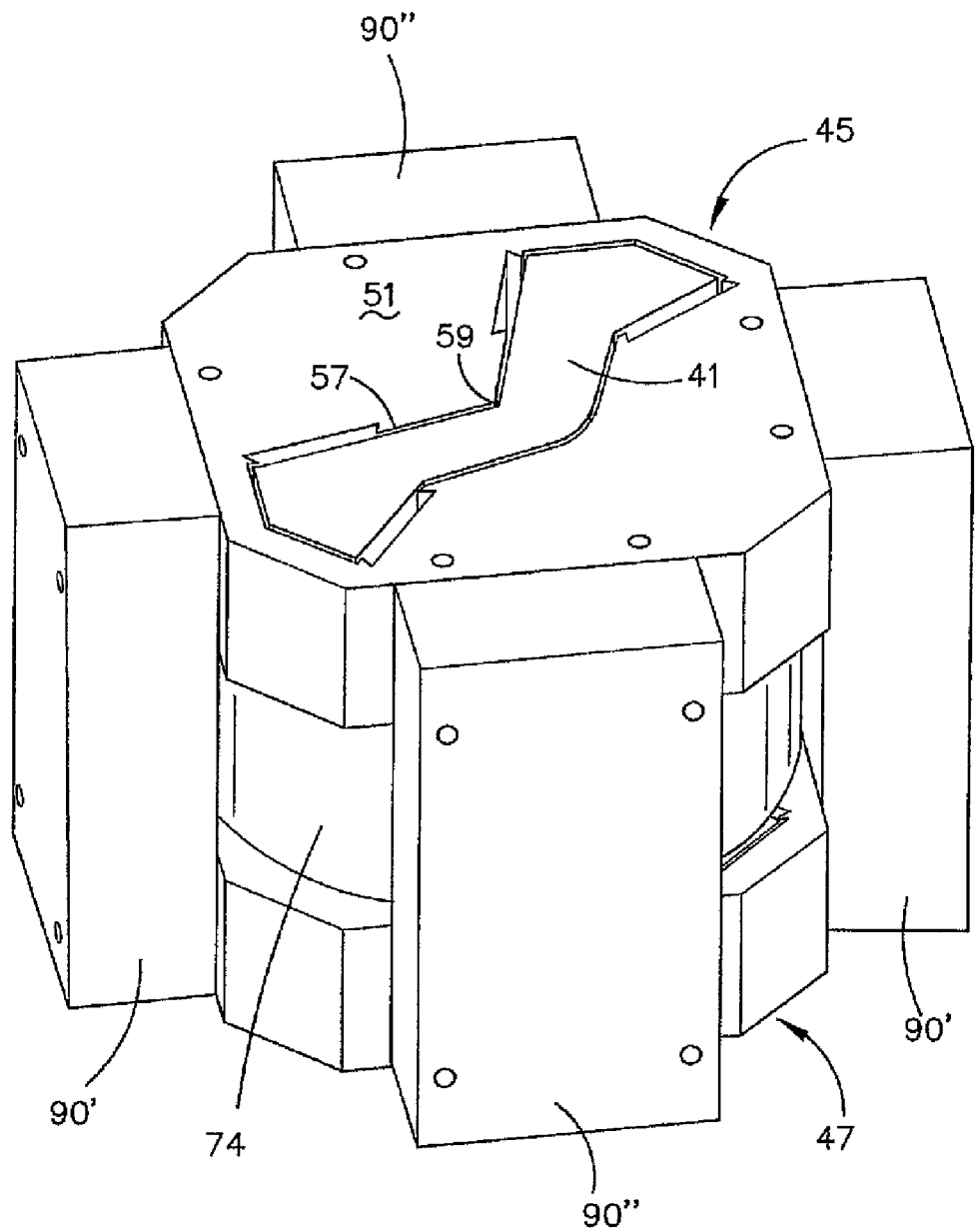
FIG. 22 is view of the assembled mounting and sensors according to the second embodiment.

FIG. 22 shows the linear and annular accelerometers 90 fixed to the housings 45 and 47.

The gravity gradient exerts a torque on a rigid body with any mass distribution provided it has a non-zero quadrupole moment. For a planar body, in the x-y plane and pivoted about the z-axis, the quadrupole is the difference between moments of inertia in the x and y directions. Thus a square or circle has zero quadrupole moment, while a rectangle has a non-zero value.

The torque produced is what constitutes the signal measured by the gradiometer.

There are two dynamical disturbances which can also produce torques and consequently are sources of error.

The first is linear acceleration.

This produces a torque if the centre of mass is not exactly at the centre of rotation—i.e. the bar is "unbalanced". The bars 41 and 42 are balanced as well as possible (using grub screws to adjust the position of the centre of mass) but this is not quite good enough, so there is a residual error. This error can be corrected by measuring the linear acceleration and using this to numerically subtract away the erroneous part of the signal.

The second is angular motion.

There are two aspects to angular motion, each of which produces a different error.

The first is aspect angular acceleration.

Angular acceleration produces a torque on the mass distribution through its moment of inertia (even if the quadrupole moment is zero). This is an enormous error and two preferred techniques are used to counteract it.

The first is to use internal rotational stabilization. This is depicted in the block diagram of FIG. 10. Here Ho(s) represents the sensor assembly pivoted about the mounting 5 (as per FIG. 9). The block A(s) represents the actuator, which provides the feedback torque to effect the stabilization by canceling the applied disturbances. T(s) represents the sensor (or transducer) which measures the effect of the applied disturbance. This is the angular accelerometer. Using angular accelerometers in rotational control is unusual—usually gyros and/or highly damped tilt meters are used, but for our purpose the angular accelerometers are better, as the error is proportional to the angular acceleration disturbance.

The second is to use common mode rejection CMRR—that is why 2 orthogonal bars are needed. For the two bars, the error torque produced by the angular acceleration is in the same direction, but the signal torque produced by the gravity gradient is in opposite direction.

Therefore, by measuring the difference in deflection between the two bars, the gradient is sensed but not the angular acceleration.

Therefore, two separate angular accelerometers 90 (labeled 90' in FIG. 22 for ease of identification) are provided. We have two independent output signals from the pair of OQR bars 41 and 42. The first is proportional to the difference in deflection, which gives the gradient signal and the second is proportional to the sum of their deflections, which is proportional to the angular acceleration and provides the sensor for the z-axis rotational control.

The x and y axes require separate angular accelerometers. Rotational stabilization about these axes is required because the pivot axes of the two bars are not exactly parallel and also to counteract the second form of error produced by angular disturbance, discussed below.

The second aspect is angular velocity.

Angular velocity produces centrifugal forces, which are also a source of error. The internal rotational stabilization provided by the actuators reduces the angular motion so that the error is below 1 Eotvos.

Figure 23:
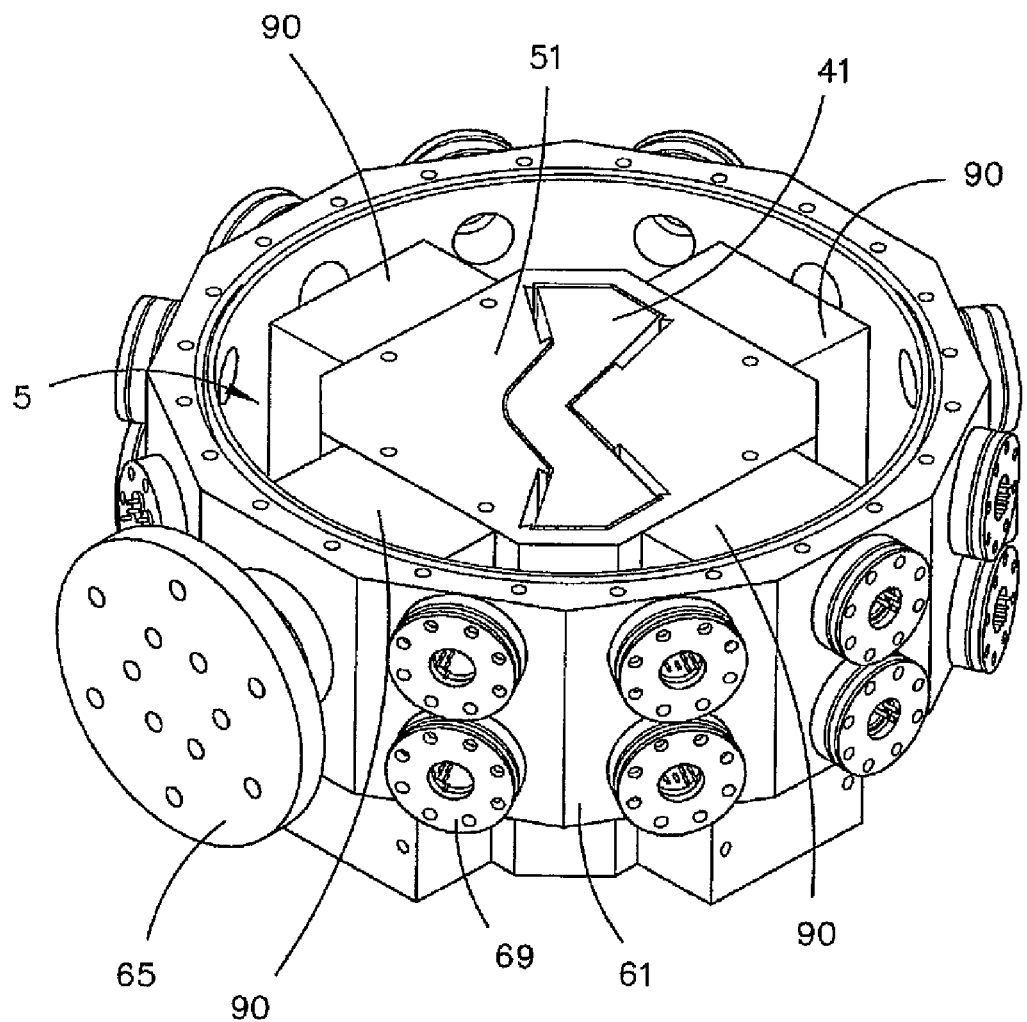
FIG. 23 is a perspective view of the gradiometer with some of the outer vacuum container removed.

FIG. 23 shows main body 61 and connector 69 with the hemispherical ends removed.

Figure 24:
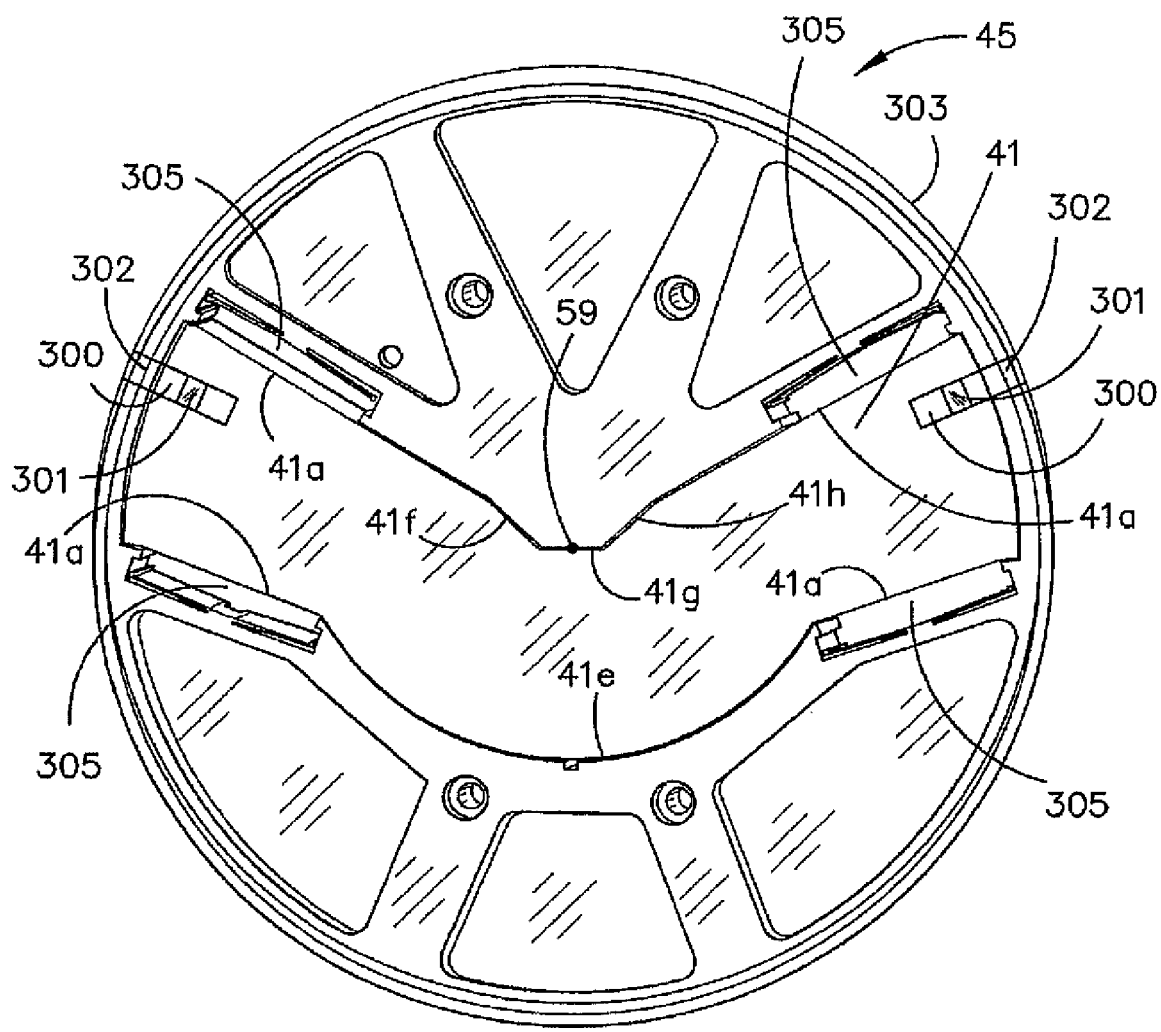
FIG. 24 is a plan view of a housing for supporting a bar according to a further embodiment of the invention.

FIG. 24 is a plan view of housing 45 according to a still further embodiment of the invention. As is apparent from FIG. 24, the housing 45 is circular rather than octagonal, as is the case with the embodiment of FIG. 8.

The housing 45 supports bar 41 in the same manner as described via flexure web 59 which is located at the centre of mass of the bar 41. The bar 41 is of chevron shape, although the chevron shape is slightly different to that in the earlier embodiments and has a more rounded edge 41e opposite flexure web 59 and a trough-shaped wall section 41f, 41g and 41h adjacent the flexure web 59. The ends of the bar 41 have screw-threaded bores 300 which receive screw-threaded members 301 which may be in the form of plugs such as grub screws or the like. The bores 300 register with holes 302 in the peripheral wall 52a of the housing 45. The holes 302 enable access to the plugs 301 by a screwdriver or other tool so that the plugs 301 can be screwed into and out of the bore 300 to adjust their position in the bore to balance the mass 41 so the centre of gravity is at the flexure web 59.

As drawn in FIG. 24, the bores 300 are a 45° angle to the horizontal and vertical in FIG. 24. Thus, the two bores 302 shown in FIG. 24 are at right angles with respect to one another.

FIG. 24 also shows openings 305 for receiving the transducer 71 for monitoring the movement of the bar 41 and producing signals which are conveyed to the SQUID device. Typically, the transducer is in the form of a coil and as the bar 41 moves slightly due to the gravity difference at ends of the bar, a change in capacitance occurs which alters the current in the coil to thereby provide a signal indicative of movement of the bar 41.

Figure 25:
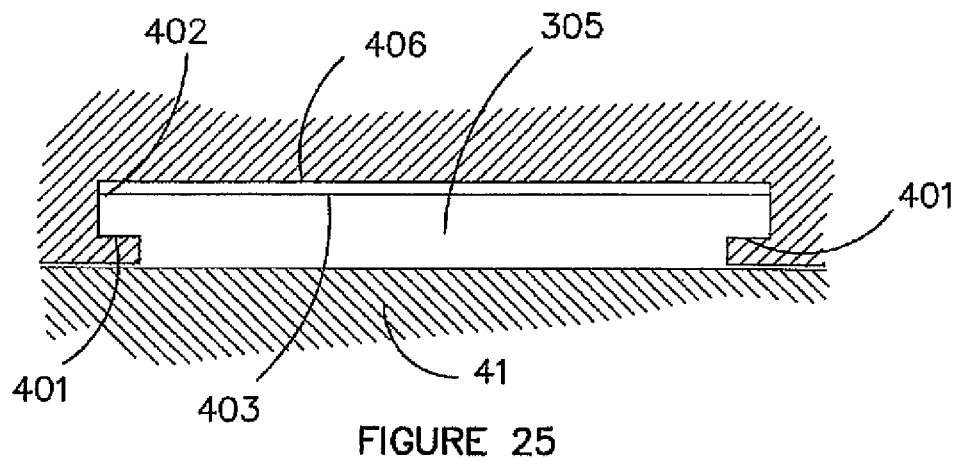
FIG. 25 is a more detailed view of part of the housing of FIG. 24.

FIG. 25 is a more detailed view of part of the housing of FIG. 24 showing the openings 305. As can be seen from FIG. 25, the openings 305 have shoulders 401 which form grooves 402. A spring 403 is arranged adjacent surface 406.

Figure 26:
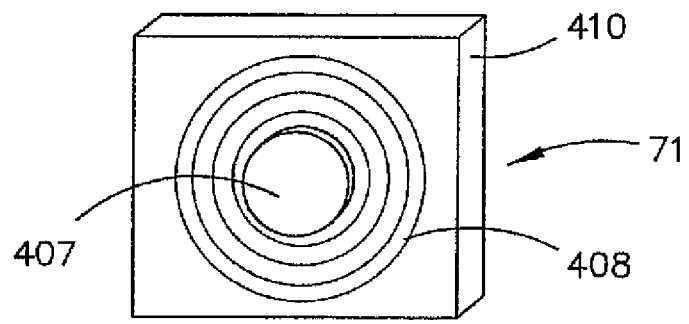
FIG. 26 is a view of a transducer used in the preferred embodiment.

FIG. 26 shows the transducer 71. The transducer 71 is formed by a generally square macor plate 410 which has a circular boss 407. A coil 408 is wound about the boss 407 and may be held in place by resin or the like. The coil 408 may be multi-layer or a single layer coil.

Figure 27:
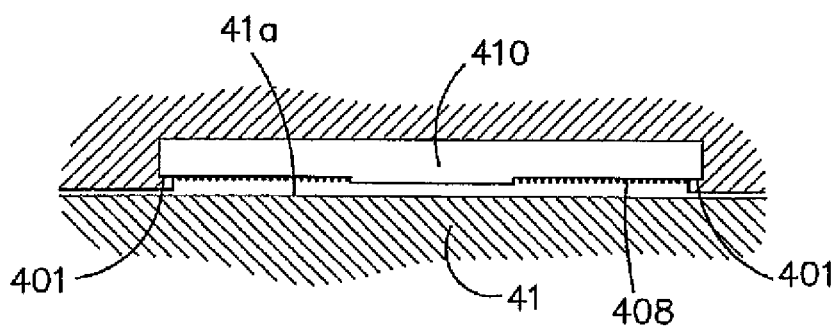
FIG. 27 is a view similar to FIG. 25 but showing the transducer of FIG. 26 in place.

FIG. 27 shows the location of the plate 410 in the opening 305 in which the plate locates in the grooves 402 and is biased by the spring 403 against the shoulders 401 to hold the plate 410 in place with the coils 408 being adjacent the edge face 41a of the bar 41.

Thus, the coil 408 and the bar 41 form an lc circuit so that when the bar 41 moves, the current passing through the coil 408 is changed.

As will be apparent from FIG. 24, four transducers 71 are arranged adjacent the ends of the bar 41. The other housing 47 also has four transducers arranged adjacent the bar 42. Thus, eight transducers 71 are provided in the gradiometer.

Figure 28:
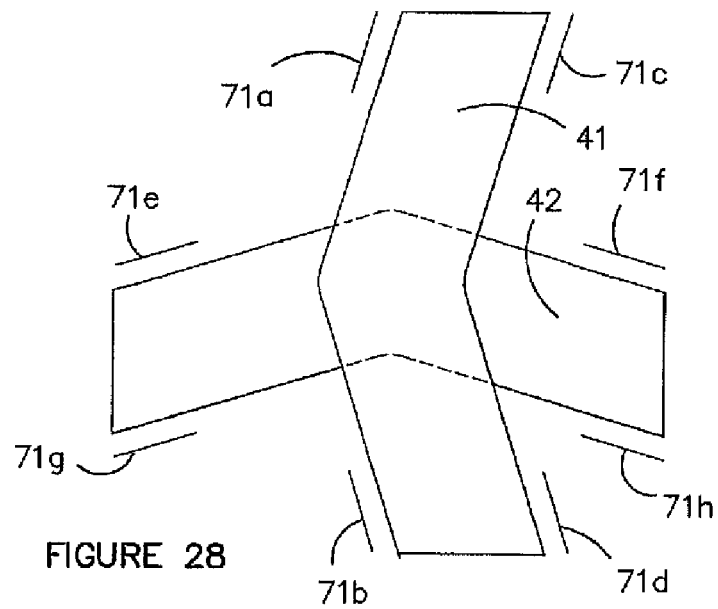
FIG. 28 is a diagram to assist explanation of the circuits of FIGS. 29 and 30.

FIG. 28 is a diagram of the bars 41 and 42 showing them in their "in use" configuration. The transducers which are located in the openings 305 are shown by reference numbers 71a to 71e to equate to the circuit diagrams of FIGS. 29 and 30.

Figure 29:
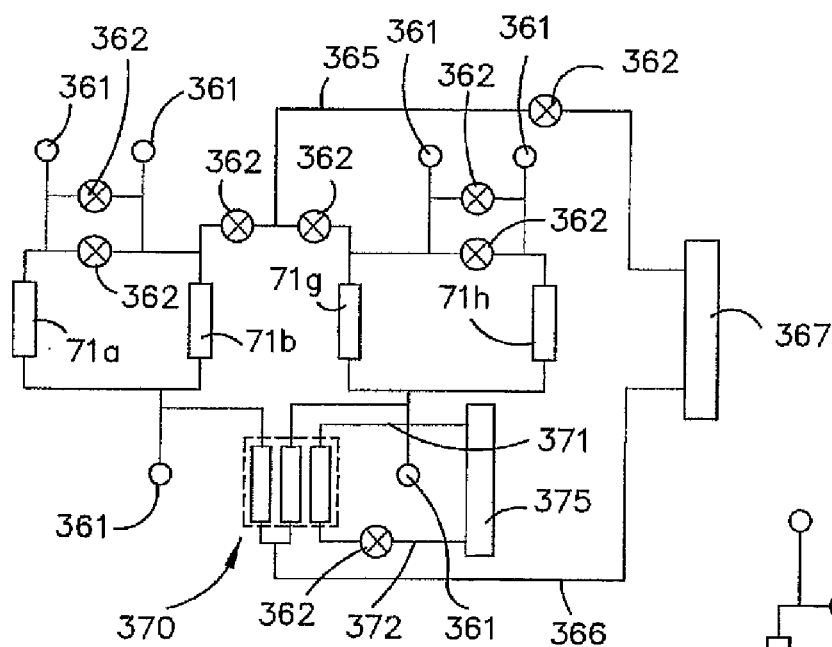
FIG. 29 is a circuit diagram relating to the preferred embodiment of the invention, particularly showing use of one of the sensors as an angular accelerometer.
Figure 30:
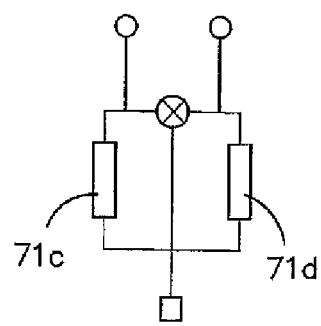
FIG. 30 is a frequency tuning circuit.

With reference to FIGS. 29 and 30, transducers 71a and 71b associated with the bar 41, and transducers 71g and 71e associated with the bar 42 are used to provide the gravity gradient measurements.

Input terminals 361 provide input current to the superconducting circuits shown in FIG. 29. Heat switches which may be in the form of resistors 362 are provided which are used to initially set the superconducting current within the circuit. The heat switches 362 are initially turned on for a very short period of time to heat those parts of the circuit at which the resistors 362 are located to stop those parts of the circuit from superconducting. Currents can then be imposed on the superconducting circuit and when the heat switches formed by the resistors 362 are switched off, the relevant parts of the circuit again become superconducting so that the current can circulate through the circuits subject to any change caused by movement of the bars 41 and 42 under the influence of the gravity gradient and angular acceleration, as will be described hereinafter.

The transducers 71a, 71b, 71g and 71e are connected in parallel to circuit line 365 and to circuit line 366 which connect to a SQUID 367.

Thus, as the bars 41 and 42 rotate about their respective flexure web, the bars 41 and 42, for example, come closer to the transducer 71a and therefore further away from the transducer 71b, and closer to the transducer 71h and further away from the transducer 71g respectively. This therefore changes the current flowing through the transducers and those currents are effectively subtracted to provide signals for providing a measure of the gravity gradient.

Figure 31:
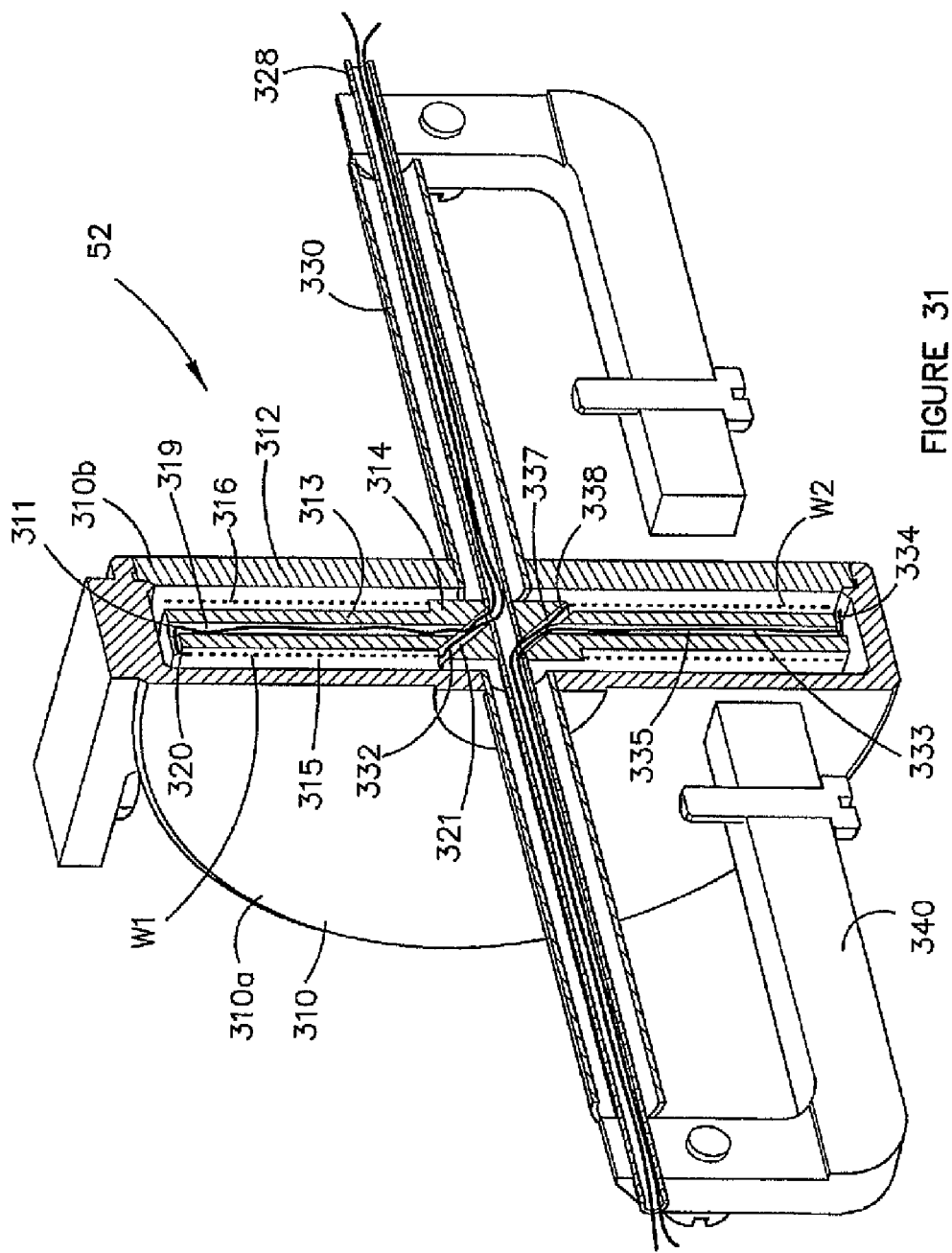
FIG. 31 is a cross-sectional view through an actuator according to one embodiment of the invention.

As is shown in FIG. 31, transducers 71c and 71d form a separate circuit and are used for frequency tuning of the bar 41 and transducers 71a and 71b. Similarly, the transducers 71e and 71f are used for frequency tuning of the bar 42 and the transducers 71g and 71h. Frequency tuning of the bars is important because the bars should be identical in order to reject angular accelerations. The frequency tuning circuits therefore enable electronic tuning of the bars to match resonant frequencies and to achieve mode rejection so that each of the bars does function in an identical manner.

The transducers 71a, 71b, 71g and 71h are also used to form angular accelerometers for measuring the angular movement of the mounting 5 so that feedback signals can be provided to compensate for that angular movement.

To do this, the line 366 is connected to a transformer 370. The polarity of the signals from the transducers 71a and 71b and 71g and 71h are reversed so that the output of the transducer 370 on lines 371 and 372 is an addition of the signals rather than a subtraction, as is the case when the gradient is measured so the addition of the signals gives a measure of the angular movement of the bars. The outputs 371 and 372 are connected to SQUID device 375 for providing a measure of the angular acceleration which can be used in the circuit of FIG. 10 to provide compensation signals to stabilise the mounting 5.

Thus, according to the preferred embodiment of the invention, the angular accelerometers 90' provide a measurement of angular acceleration, for example, around the x and y axes, and the angular accelerometer formed by the bars 41 and 42 and the transducers 71a, 71b, 71g and 71h provide a measure of the angular accelerometer around the, for example, z axis.

Figure 32:
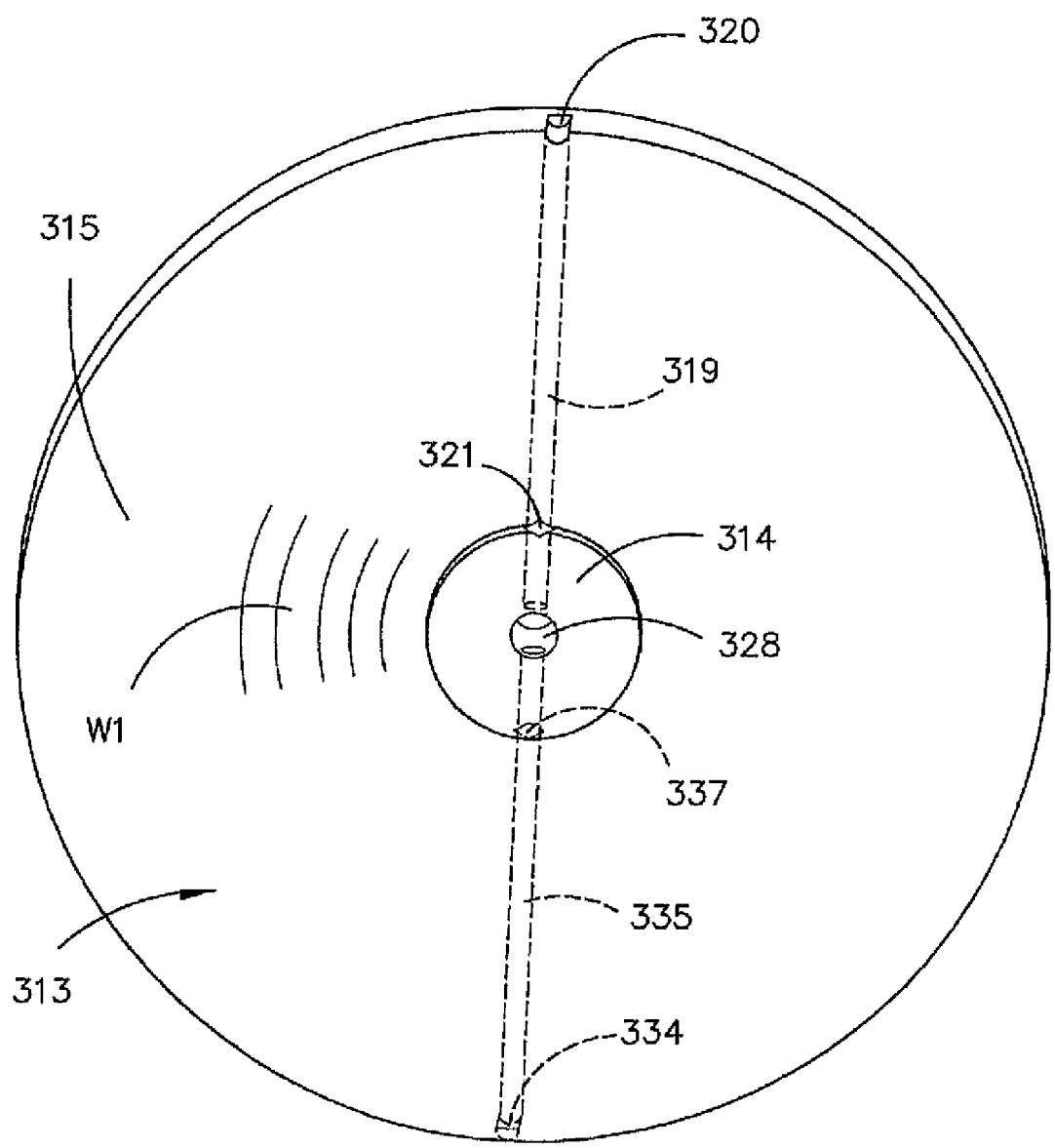
FIG. 32 is a view of part of the actuator of FIG. 31.

FIGS. 31 and 32 show an actuator for receiving the control signals to adjust the mounting in response to angular movement of the mounting 5.

The actuator shown in FIGS. 31 and 32 are schematically shown in FIG. 10 by reference numerals 52, 53, 54 and 55. All of the actuators are the same and FIGS. 31 and 32 will be described with reference to the actuator 52 which makes adjustment around the x axis shown in FIG. 10.

Actuator 52 shown in FIG. 31 has a hollow disc housing 310 which has a mounting bracket 311 for connecting the disc housing 310 to mounting 5. The hollow disc housing 310 therefore defines an inner chamber 312 in which is located coil support plate in the form of a disc 313. The disc 313 has a wide hub section 314 and two annular surfaces 315 and 316 onto which windings W1 and W2 of coils are wound about the hub 314.

The disc 313 is also provided with a radial bore 319 and a hole 320 at the periphery of the disc 313 which communicates with the bore 319. A hole 321 is provided at the hub 314 and communicates with the bore 319 and extends to a hollow rod 328 which locates in a tube 330. The rod 330 is fixed to the disc 313 and also to support frame 340 which is fixed to main body 61 (not shown in FIG. 31). The tube 330 is connected to the disc housing 310 for movement with the disc housing 310 relative to disc 313, rod 328 and frame 340.

The winding W1 provided on the face 315 has a lead 331 which passes through the hole 320 and then through the bore 319 to the hole 321 and then through the tube 328 to the right, as shown in FIG. 31. A lead 332 from the other end of the winding W1 passes through the hole 321 and through the hollow rod 328 also to the right so that current can be supplied to the winding W1 through the leads 331 and 332.

The second winding W2 provided on the face 316 has a lead 333 which passes through a radial hole 334 and bore 345 in the disc 313 and then through hole 337 to tube 328 and to the left in FIG. 31. The other end of the winding W2 has a lead 338 which passes through the hole 337 into the tube 328 and to the left in FIG. 31. Thus, current can circulate through the winding W2 via the leads 333 and 338.

When the windings W1 and W2 are energised or the current passing through the windings changes, the disc housing 310 is moved relative to the disc 313 and frame 340 and because the disc housing 310 is connected to the mounting 5 by the bracket 311, the mounting 5, in the case of the actuator 52, is adjusted. The movement of the disc housing 310 is generally a longitudinal movement (i.e. linear movement) in the direction of the axis of the tube 330 and rod 328. To facilitate such movement, clearance is provided between the ends of the rod 330 and the frame 340 and about the disc 313. The bracket 311 is offset relative to the flexure web (such as the flexure web 37) so that movement of the housing 310 applies a torque to the first part 25 of the mounting 5 to cause rotation of the part 25 about the flexure web 37.

In the preferred embodiment of the invention, four actuators are provided for providing actual adjustment about the various axes and flexure webs and the actuators operate in combination in response to signals received from the angular accelerometers to maintain stability of the mounting 5 when the gradiometer is in use.

For cryogenic operation of the gradiometer, the mounting 5, housings 45 and 47, bars 41 and 42, the hollow disc housing 310, coils, and electrical leads referred to previously, are all made from superconducting material such as niobium.

In embodiments of the invention where the gradiometer is not cryogenically operated, the components can be formed from other materials such as aluminium.

The angular accelerometers 90' have zero quadrupole moment which means that the centre of mass coincides with the flexure web and that consequentially they are insensitive to both gravity gradient and centrifugal force. Linear accelerometers 90" (FIG. 22) could also be provided.

The linear accelerometers 90" do not apply active compensation but may apply corrections to the final measured gradient data. Thus, data relating to linear acceleration can be recorded and possibly used in later processing.

One or both of the bars 41 and 42 can also be used as an angular accelerometer to provide a measure of angular movement of the mounting 5 so that appropriate feedback signals can be generated to compensation for that movement by control of the actuators previously described.

In the preferred embodiment, four angular accelerometers are provided with two of the accelerometers being formed by the bars 41 and 42. The use of four accelerometers arranged at 45° angles with respect to one another enables adjustment about the x, y and z axes by torque supplied from two or more of the actuators at any one time.

The disc 310 prevents flux from the windings W1 and W2 from leaving the actuator and because the leads 331 and 332 and 333 and 338 leave the actuator through the elongate tube 330, the ability of flux to pass out of the actuator is substantially prevented.

Thus, spurious magnetic fields which may detrimentally effect operation of the instrument are not generated by the actuator and therefore do not influence the sensitivity or operation of the instrument.

The tube 330 preferably has a length to diameter ratio of 10:1 at the least.

The disc plate 316 is preferably formed from macor and the hollow disc housing 310 is formed in two parts 310a and 310b. The part 310b forming a closure panel which enables the disc 313 to be located in the chamber 312 and then the disc housing 310 closed by locating the plate 310b in place.

Figure 33:
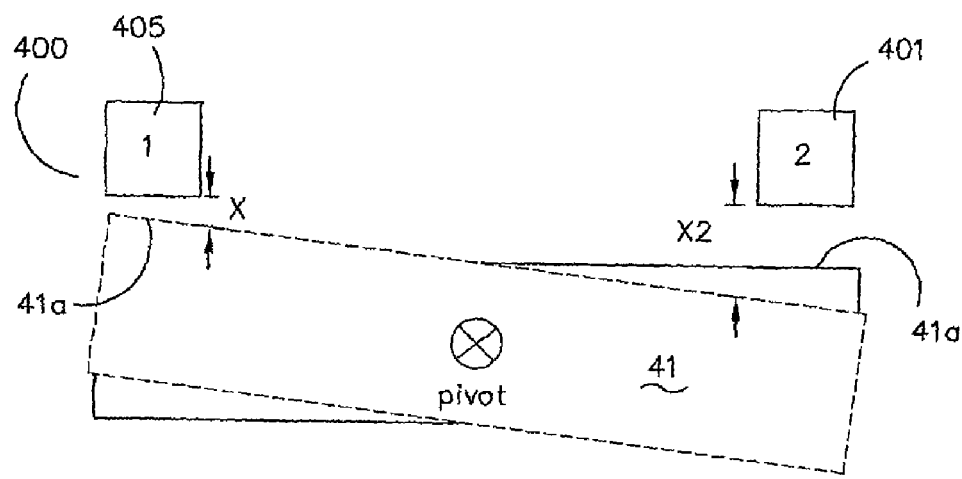
FIG. 33 is a diagram illustrating balancing of the sensors of the gradiometer of the preferred embodiment.
Figure 34:
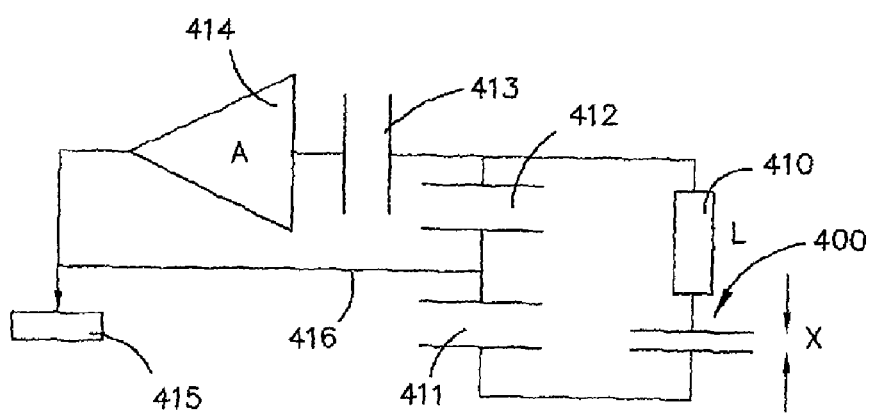
FIG. 34 is a circuit diagram of a calibration sensor used when balancing the gradiometer.

With reference to FIGS. 33 and 34, the manner in which the balance of the bars 41 and 42 is achieved will be described. A pair of displacement sensors formed by capacitors 400 and 401 are provided for two main purposes:
1. To measure the residual linear acceleration sensitivity of each bar 41 (and 42) to enable the bars to be mechanically balanced using the grub screws 301 described with reference to FIG. 24, before operation at low temperatures; and
2. To measure the induced linear acceleration sensitivity of each bar 41 and 42.

The bars 41 and 42, in their respective housings, are rotated in a jig (not shown) through 360°. This provides an acceleration range of 2 $g_E$, which is typically 100 times greater than the accelerations which may be conveniently applied at low temperature. A typically requirement is for the capacitors 400 and 401 to be able to detect 0.1 nm over a period of 1 to 20 minutes. A pair of capacitors 400 and 401 is required for each bar to provide some discrimination against sensor drift, since rotation of the bar 41 will cause one capacitor 400 to increase and the other capacitor 401 to decrease by the same amount, as is shown in FIG. 33, whereas thermal expansion will cause both outputs of the capacitors 400 and 401 to increase. The capacitors 400 and 401 remain in place, even though they are unusable at low temperatures, and therefore their components need to be non-magnetic so as to not interfere with the operation of the gradiometer and, in particular, its nearby superconducting circuitry.

FIG. 33 shows that as the bar 41 pivots, the gap applicable to the capacitor 400 decreases and the gap of the capacitor 401 increases.

The capacitors 400 and 401 are formed by the face 41a of the bar 41 (and the corresponding face on the other bar 42) and second plates 405 which are spaced from the face 41a. The gap between the plates of the respective capacitors 400 and 401 must typically be resolved to about 1 ppm.

FIG. 34 shows the calibration circuit applicable to the capacitor 400. A circuit for the other capacitor 401 is identical.

The capacitor 400 forms a high Q-factor resonant circuit with inductor 410. The inductor 410 and capacitor 400 are provided parallel to capacitors 411 and 412 and connect via capacitor 413 to an amplifier 414. The output of the amplifier 414 is provided to a frequency counter 415 and also fed back between the capacitors 412 and 411 by line 416. The capacitor 400 therefore determines the operating frequency of the amplifier 414 which can be read to a high precision.

If the bar 41 is out of balance, the frequency counter 45 will tend to drift because of the imbalance of the bar. This can be adjusted by moving the grub screws 301 into and out of the masses as previously described until balance takes place. The amplifier 414 can then be disconnected from the frequency counter 415 so that the gradiometer can be arranged within the Dewar 1 with the other parts of the circuits shown in FIG. 34 in place.

Since modifications within the spirit and scope of the invention may readily be effected by persons skilled within the art, it is to be understood that this invention is not limited to the particular embodiment described by way of example hereinabove.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gravity gradiometer for measuring components of the gravity gradient tensor, comprising:
a sensor for measuring the components of the gravity gradient tensor;
a mounting supporting the sensor for rotation about three substantially orthogonal axes;
a stabilizing mechanism for stabilizing the mounting by adjusting the mounting about at least one of the axes; and
an angular accelerometer for providing a signal indicative of a rotation of the sensor to cause the stabilizing mechanism to apply a force to the mounting to counteract that rotation of the sensor and stabilize the mounting and the sensor,
wherein the sensor is an orthogonal quadrupole responder comprising two sensor bars arranged orthogonal to one another, each sensor bar being supported on the mounting for pivoting movement about one of the axes, and
wherein the angular accelerometer is supported on the mounting for movement with the sensor and comprises a pivoting accelerometer mass having a zero quadrupole moment so the accelerometer mass is not sensitive to the gravity gradient and centrifugal force errors, whereby the angular accelerometer is configured to produce a signal indicative only of a rotation of the sensor to be counteracted by the stabilizing mechanism.

2. The gravity gradiometer of claim 1 wherein the sensor bars are positioned in sensor housings carried on the mounting and coupled to the sensor housings by respective sensor flexure webs for rotation about the one axis.

3. The gravity gradiometer of claim 1 wherein the accelerometer mass is positioned in an accelerometer housing carried on the mounting an coupled to the accelerometer housing by an accelerometer flexure web.

4. The gravity gradiometer of claim 3 wherein the accelerometer mass is formed by a cut through the accelerometer housing except for where the accelerometer mass connects to the accelerometer housing by the accelerometer flexure web.

5. The gravity gradiometer of claim 1 wherein the accelerometer mass is of chevron shape.

6. The gravity gradiometer of claim 1 wherein the angular accelerometer is one of a plurality of such accelerometers for providing signals indicative of rotations of the sensor about more than one of said three orthogonal axes.

* * * * *

UNITED STATES PATENT AND TRADEMARK OFFICE
CERTIFICATE OF CORRECTION

PATENT NO. : 8,074,515 B2
APPLICATION NO. : 12/714634
DATED : December 13, 2011
INVENTOR(S) : Frank Joachim Van Kann et al.

Page 1 of 1

It is certified that error appears in the above-identified patent and that said Letters Patent is hereby corrected as shown below:

Column 1, line 12, delete "2006" and insert --2006.--, therefor.

In claim 3, column 12, line 53, delete "an" and insert --and--, therefor.

Signed and Sealed this
Sixth Day of November, 2012

David J. Kappos
*Director of the United States Patent and Trademark Office*